United States Patent

Saito et al.

[11] Patent Number: 6,104,832
[45] Date of Patent: *Aug. 15, 2000

[54] IMAGE PROCESSING METHOD AND APPARATUS

[75] Inventors: Kazuyuki Saito, Machida; Tohru Niki, Yokohama; Tadanori Nakatsuka, Machida; Akihiro Matsumoto, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/574,598

[22] Filed: Dec. 18, 1995

Related U.S. Application Data

[63] Continuation of application No. 08/118,767, Sep. 10, 1993, abandoned.

[30] Foreign Application Priority Data

Sep. 11, 1992 [JP] Japan .................................. 4-243252
Sep. 25, 1992 [JP] Japan .................................. 4-256315
Jan. 11, 1993 [JP] Japan .................................. 5-002700

[51] Int. Cl.$^7$ ........................................ G06K 9/34
[52] U.S. Cl. .......................... 382/176; 382/173; 358/462
[58] Field of Search ................... 382/173, 174, 382/176, 178, 180; 395/109; 358/453, 462

[56] References Cited

U.S. PATENT DOCUMENTS

| | | | |
|---|---|---|---|
| 4,856,074 | 8/1989 | Nagaoka .................................. | 382/22 |
| 4,856,075 | 8/1989 | Smith ...................................... | 382/50 |
| 4,926,251 | 5/1990 | Sekizawa et al. ........................ | 358/75 |
| 5,048,107 | 9/1991 | Tachikawa .............................. | 382/173 |
| 5,113,251 | 5/1992 | Ichiyanagi et al. ...................... | 358/75 |
| 5,202,933 | 4/1993 | Bloomberg ................................ | 382/9 |
| 5,206,687 | 4/1993 | Suzuki et al. ............................ | 355/214 |
| 5,384,863 | 1/1995 | Huttenlocher et al. ................. | 382/173 |

FOREIGN PATENT DOCUMENTS

| | | | |
|---|---|---|---|
| 496531 | 7/1992 | European Pat. Off. ......... | G06K 9/32 |
| 1015889 | 1/1989 | Japan .............................. | G06K 9/20 |
| 89-015889 | 1/1989 | Japan .............................. | G06K 9/20 |
| 3214967 | 9/1991 | Japan .............................. | G06K 9/20 |

OTHER PUBLICATIONS

Fujitsu–Scientific and Technical Journal, vol. 26, No. 3, Sep. 1990, Kawasaki, Japan, pp. 224–233, Sato et al. "F6365 Japanese Document Reader".

Signal Processing VI, Theories and Applications, Proceedings of EUSIPCO–92, Sixth European Signal Processing Conference, Aug. 24, 1992, Brussels, pp. 615–618, Chang et al. "Rule–Based System for Chinese Newspaper Segmentation".

NEC Research and Development, vol. 32, No. 3, Jul. 1991, Tokyo, Japan, pp. 430–437, Mizuno et al., "Document Recognition System with Layout Structure Generator".

*Primary Examiner*—Bhavesh Mehta
*Attorney, Agent, or Firm*—Fitzpatrick, Cella, Harper & Scinto

[57] ABSTRACT

An image processing apparatus includes an image input unit which inputs an image, and an image thinner for taking the OR of (m dots in the vertical direction)×(n dots in the horizontal direction) of the input image, thereby thinning out the (m×n) pixels and newly forming one pixel. A labeler adds labels to black pixels of every line of the thinned out image. The same label is added to pixels which are continuous in the vertical, horizontal or oblique direction and simultaneously traces a rectangle. A separator detector distinguishes a rectangle corresponding to a sentence portion, a rectangle corresponding to a figure or photograph, a rectangle corresponding to a table, and a rectangle corresponding to a separator, by using a width, a height, an area, and a pixel density (the number of pixels in the area) of the rectangle added to the label by the labeler. The area of the input image is divided based on the result of the detection of the separator detector.

21 Claims, 41 Drawing Sheets

| RECTANGLE DATA |
| --- |
| RECTANGLE LABEL |
| INITIAL POINT COORDINATE |
| TERMINAL POINT COORDINATE |
| PIXEL LABEL |
| THE NO. OF PIXELS |

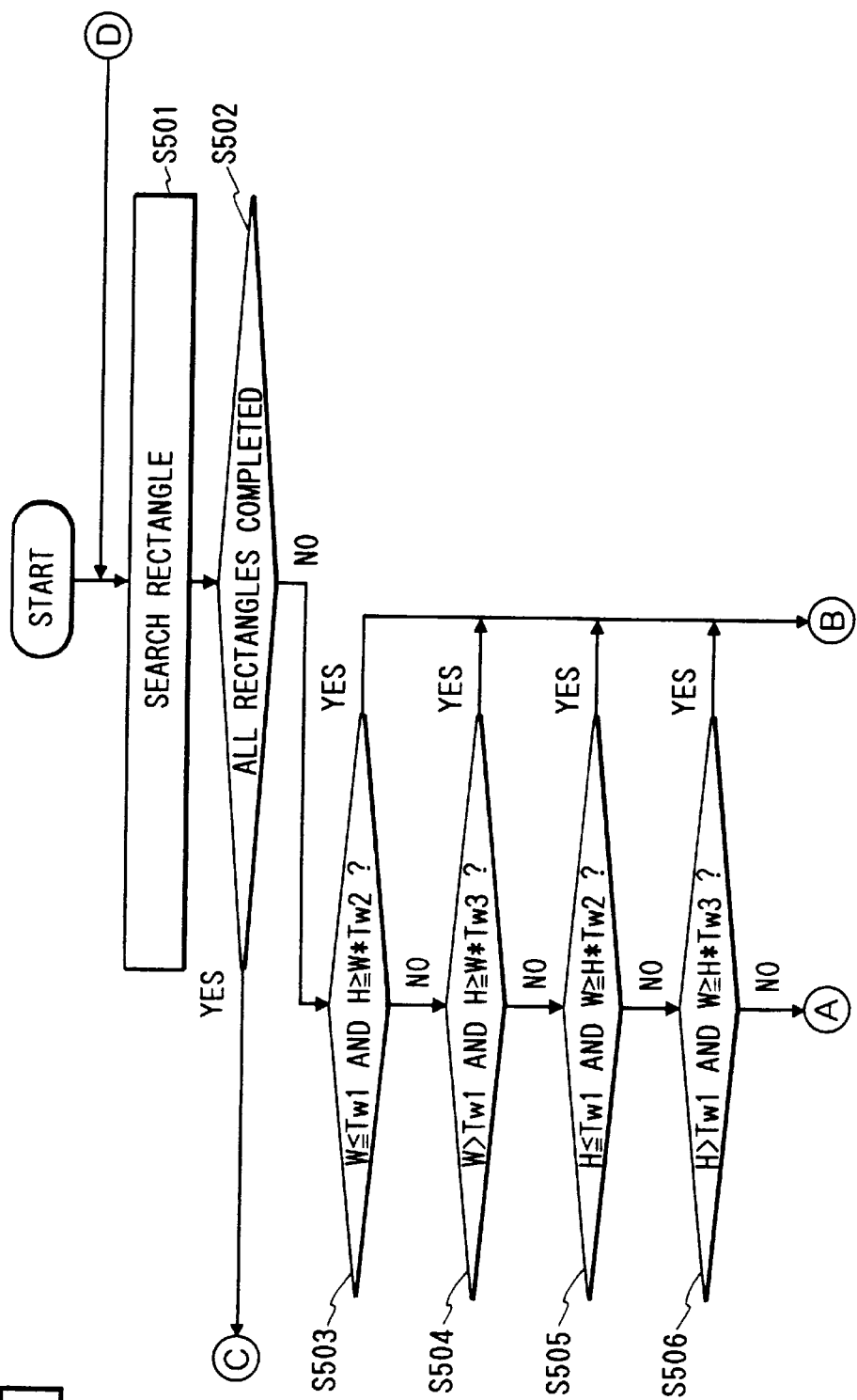

* FIGURE OR PHOTOGRAPH, IF W ≥ Tw4 AND H ≥ Tw4 AND D ≥ Td5

FIG. 15

| RECTANGLE DATA |
| --- |
| RECTANGLE LABEL |
| INITIAL POINT COORDINATE |
| TERMINAL POINT COORDINATE |
| PIXEL LABEL |
| THE NO. OF PIXELS |

| RECTANGLE LABEL | ATTRIBUTE |
| --- | --- |
| POSITIVE INTEGER | BODY |
| 0 | INVALID |
| -1 | NOT USED |
| -2 | NOT USED |
| -3 | SEPARATOR |
| -4 | TABLE |
| -5 | FIGURE, PHOTOGRAPH |

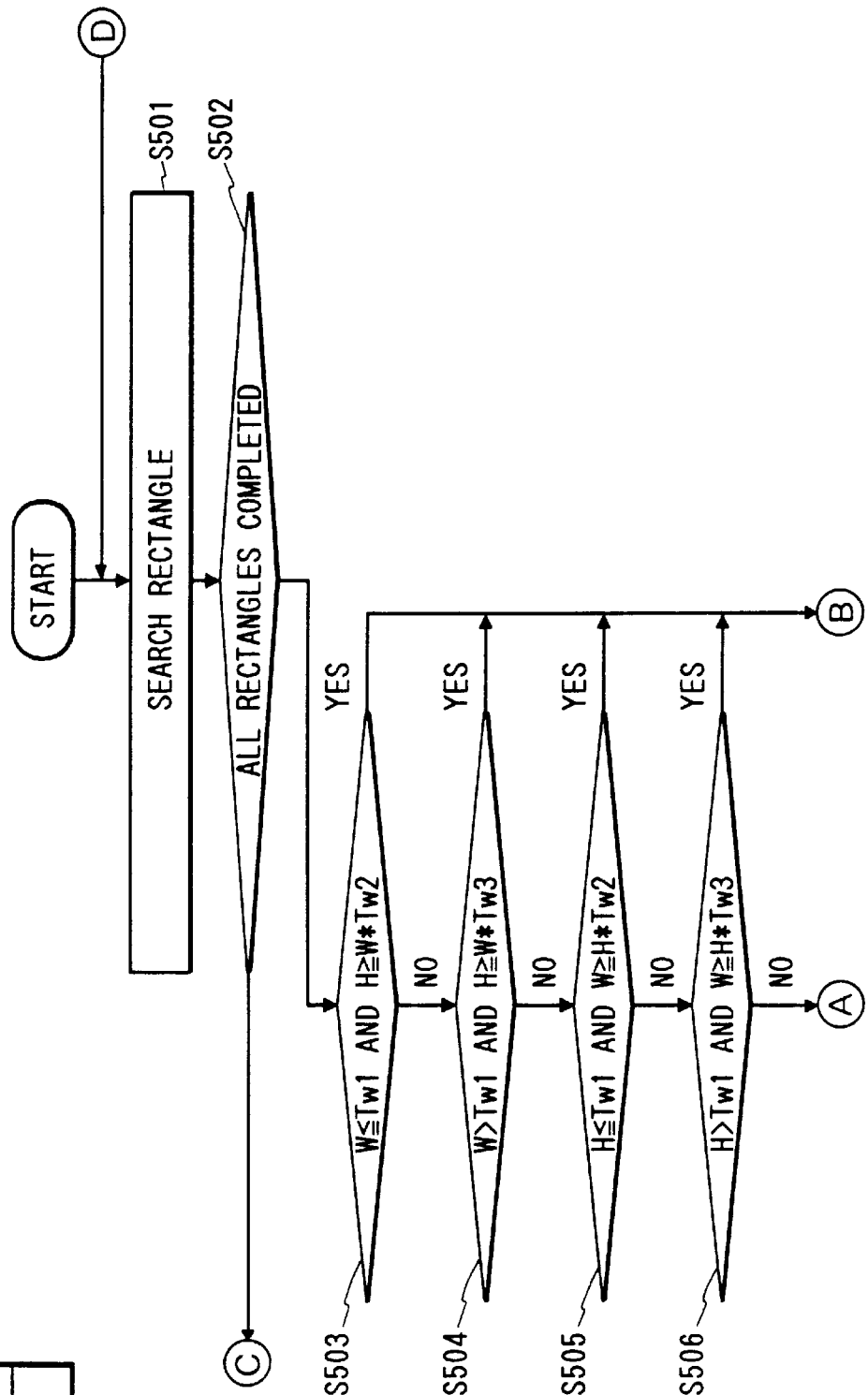

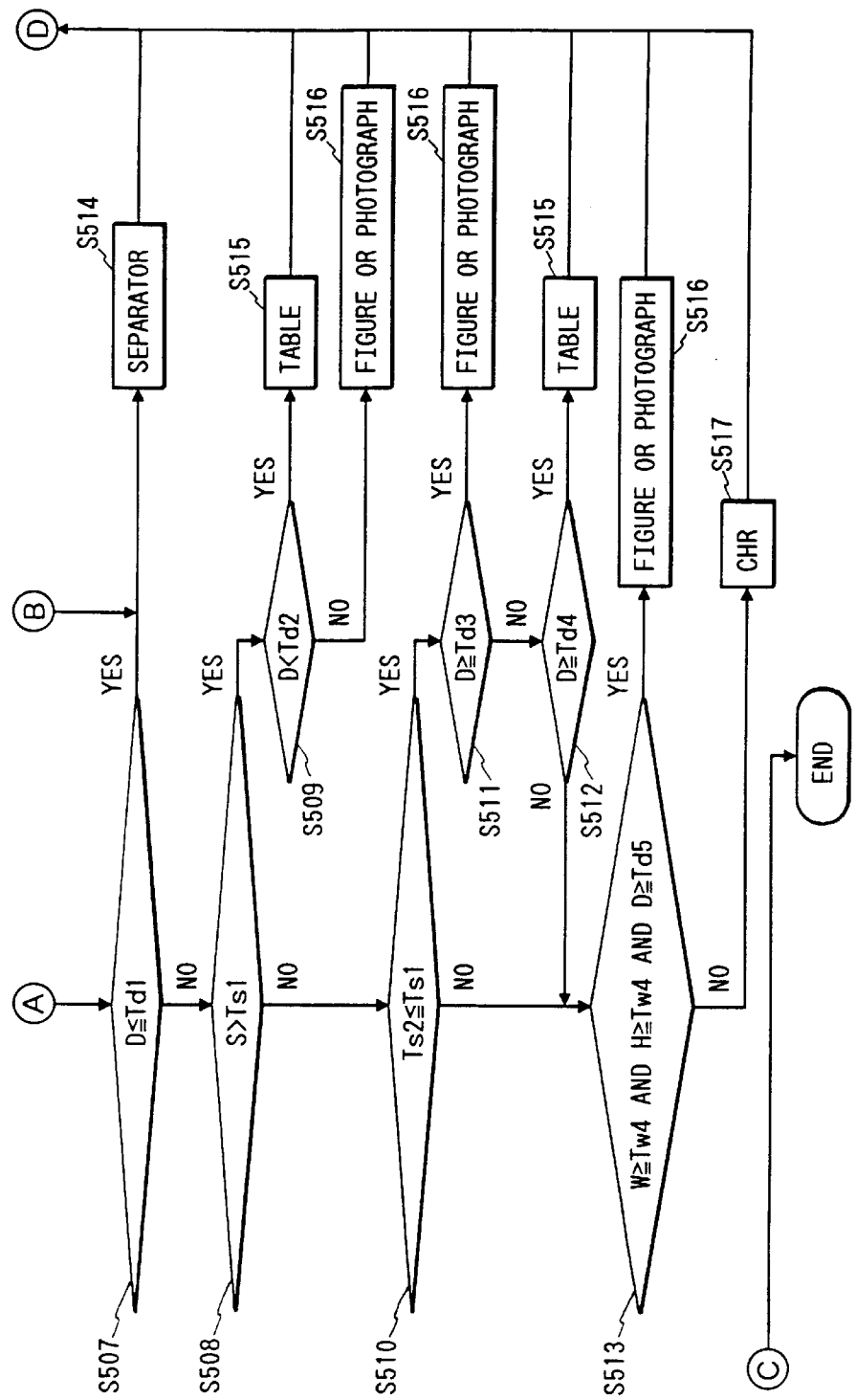

* FIGURE OR PHOTOGRAPH, IF W ≥ Tw4 AND H ≥ Tw4 AND D ≥ Td5

| AREA DATA |
|---|
| INITIAL POINT COORDINATE |
| TERMINAL POINT COORDINATE |
| ATTRIBUTES |

IMAGE PROCESSING METHOD AND APPARATUS

This application is a continuation of Application Ser. No. 08/118,767 filed Sep. 10, 1993, now abandoned.

BACKGROUND OF THE INVENTION

1. Field of the Invention

The invention relates to an image processing apparatus for, particularly, dividing an input image into a character area, an area of a figure, a table, or the like in an electronic apparatus such as an OCR (optical character recognizing) apparatus, copying apparatus, facsimile apparatus, or the like.

2. Related Background Art

In a conventional image processing apparatus, there is an apparatus using a run length analyzing method as area dividing means whereby a distribution of run lengths is examined and a character area, a figure area, or the like is divided in accordance with a length of a white run or a black run. Another apparatus uses a spectrum analyzing method whereby a Fourier spectrum of an input image is analyzed and the input image is divided into various kinds of areas. Yet another apparatus uses a projection analyzing method whereby projections (histograms) in the vertical and horizontal directions are alternately repeatedly obtained and the area is divided from the information of a peripheral portion as disclosed in JP-A-1-15889.

The above conventional techniques, however, have problems such that it takes an extremely long time for arithmetic operating processes. Further, processes are executed to the pixels of an image, so that a memory area increases significantly, and a dividing precision of a complicated area construction to the image is low.

In the conventional image processing apparatus, as an area dividing means, a method is used whereby a discrimination regarding whether an area is a table or another area is made on the basis of a ratio of the area of a circumscribed rectangle and the number of pixels, and the area is divided on the basis of the result of the discrimination.

The above conventional technique, however, has a problem such as in the case where a separator or the like (modified separator) formed by complicated polygonal lines is handled as one area. When the number of pixels for the area of the circumscribed rectangle increases, such an area are erroneously recognized as a table area and a dividing precision of the area decreases.

In the conventional image processing apparatus, in the case where the attributes (character, figure, table, etc.) of the divided area are erroneously discriminated, the area data which was erroneously discriminated is eliminated and a correct area frame is newly designated by a manual operation of the operator.

In a conventional technique such that the correction of the divided area is executed by a manual operation of the operator, in the case where a plurality of erroneous divided areas exist, there is a problem such that a burden on the operator increases and a long time is needed as a ratio to the processing time of the whole image processes.

In such a type of well-known image processing apparatuses, in the case where the image area was erroneously divided, area data of the erroneous area is eliminated and the operator newly designates the correct area frame by frame using a pointing device or the like.

The above conventional technique, however, has problems such that in case of a complicated area construction, a burden of the operation of the operator increases, it takes an extremely long time as a ratio to the processing time of the whole image processes.

SUMMARY OF THE INVENTION

In consideration of the above problems, it is an object of the invention to provide an image processing apparatus which can realize the reduction of the processing time when an area is divided, the decrease in size of a recording area and the improvement of a dividing precision of a complicated area construction. After an input image is thinned out, it is further converted into rectangle data by using a labeling and an area is divided into a character area and an area of a figure or photograph, a table, a separator, an index, or the like. Therefore, there are effects such that without changing the existing electronic parts and circuits, (1) reduction in processing time, (2) decrease in size of a memory area, (3) improvement of a dividing precision of a complicated area construction are obtained.

According to the invention, the input image is converted into rectangle data and is classified into a character area and an area of a figure, photograph, table or separator and, further, partial histograms of the left and right edges in the vertical and horizontal directions of the area which was temporarily determined to be a table area are calculated and compared, thereby deciding whether the area is a table area or not. There are, consequently, effects such that without changing the existing electronic parts and circuits, (1) an improvement of the precision is obtained for the division of a complicated area construction, particularly, the division of an area construction including a table and, (2) the processing time is short because the histograms are partially obtained.

According to the invention, an input image is converted into rectangle data and is classified into a character area and an area of a figure or a photograph, table or separator, and further the rules in the vertical and horizontal directions of the area which was temporarily decided as a table area are detected and counted, thereby deciding whether the area is a table area or not. Thus, there is an effect such that without changing the existing electronic parts or circuits, (1) the improvement of the precision is obtained for the division of a complicated area construction, particularly, the division of an area construction including a table.

According to the invention, an input image is converted into rectangle data and is classified into a character area or an area of a figure or a photograph, table, or separator and a ratio of the area in a frame to the area of the area which was temporarily decided as a table area is obtained. When such a ratio is equal to or larger than a threshold value, the area is determined to be a table. Thus, there are effects such that without changing the existing electronic parts or circuits;

(1) an improvement of the precision obtained for the division of a complicated area construction, particularly, the division of an area construction including a table, (2) since the area in the frame is used, even when the table frame slightly lacks, the decision about the table can be accurately performed, (3) since the area in the frame is used, the decision about the table is strong for an inclination and can be accurately performed.

According to the invention, by combining the erroneously divided areas and correcting the erroneously presumed attributes, there are effects such that without changing the existing area dividing process, (1) an operating efficiency can be improved and (2) a processing time can be reduced.

It is another object of the invention to provide an image processing apparatus which can combine erroneously divided areas by a simple operation and the attributes of each area can be also easily corrected.

By providing correcting means for integratedly combining special divided areas, the erroneously divided areas are combined and, further, the necessary area attributes can be corrected. Therefore, without changing the existing area dividing process, (1) an operating efficiency can be improved and (2) a processing time can be reduced.

BRIEF DESCRIPTION OF THE DRAWINGS

FIG. 15 is a diagram showing a rectangle data structure and the relation between the rectangle label and the attributes of the embodiment 2;

FIG. 16 is comprised of FIGS. 16A and 16B showing flowcharts of a process of a separator detector of the embodiment 2;

DESCRIPTION OF THE PREFERRED EMBODIMENTS

Embodiment 1

The first embodiment of the invention will now be described hereinbelow with reference to FIGS. 1 to 11.

Figure 1:
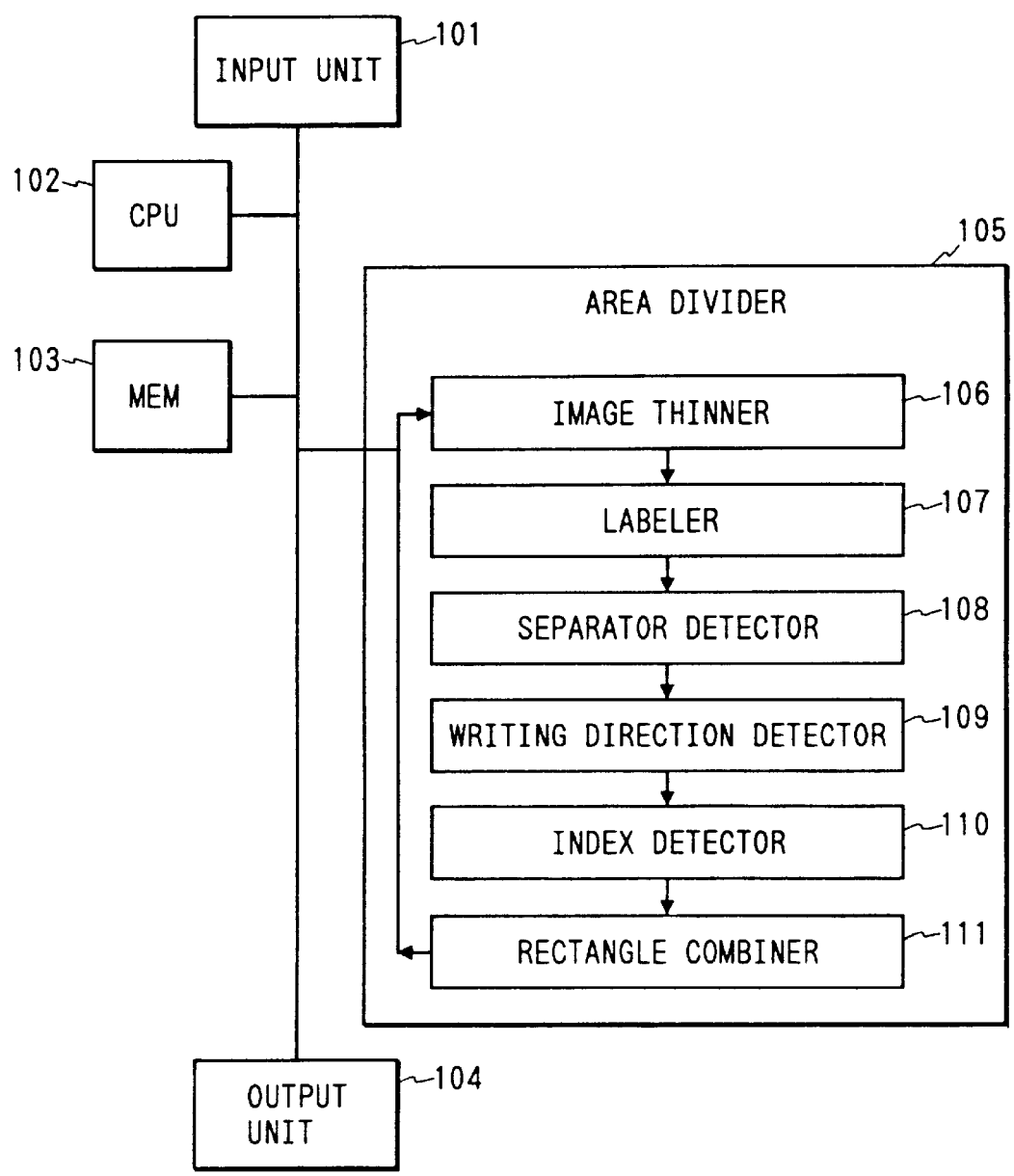
FIG. 1 is a block diagram showing a schematic construction of an image processing apparatus of an embodiment of the invention.

FIG. 1 shows a schematic construction of an image processing apparatus of an embodiment of the invention. In the diagram, reference numeral 101 denotes an input unit of image data; 102 a central processing unit (CPU) to control the apparatus and execute an arithmetic operation of a process in each unit; 103 a memory to store control programs shown in the flowcharts, which will be explained hereinlater, and various kinds of data; 104 an output unit to generate the results of the operating processes, the results of the image processes, and the image data; and 105 an area divider to execute a whole area dividing process.

An internal construction of the area divider 105 will now be described. First, reference numeral 106 denotes an image thinner to thin out an input image in a manner such that (m×n) pixels are thinned out by taking the OR of the vertical (m) dots and the horizontal (n) dots of the input image and as a result one pixel is newly formed to replace the (m×n) pixels. Reference numeral 107 denotes a labeler for labeling the pixel obtained by the thinning-out process and for simultaneously forming initial rectangle data. That is, a label is added to the black pixels of the image for every line and the same label is added to the pixels which are continuous in the vertical, lateral, or oblique direction and, at the same time, a rectangle is traced. Reference numeral 108 denotes a separator detector to detect a separator, a table, a figure, or the like. By using the width of the above rectangle, height, area, and the number of pixels, namely, pixel density to the area, the separator detector 108 distinguishes a rectangle corresponding to a character portion (body), a rectangle corresponding to a figure or photograph, a rectangle corresponding to a table and a rectangle corresponding to a separator. Reference numeral 109 denotes a writing direction detector to detect the writing direction of a sentence such as vertical writing or a horizontal writing. The writing direction detector 109 presumes a vertical writing sentence or a horizontal writing sentence by comparing the width and height of the rectangle corresponding to the character portion (body). Reference numeral 110 denotes an index detector to detect an index by using the writing direction and the character size. Reference numeral 111 denotes a rectangle combiner to combine rectangles by using an imaginary rectangle which is obtained by enlarging the size of an inherent rectangle.

Figure 2:
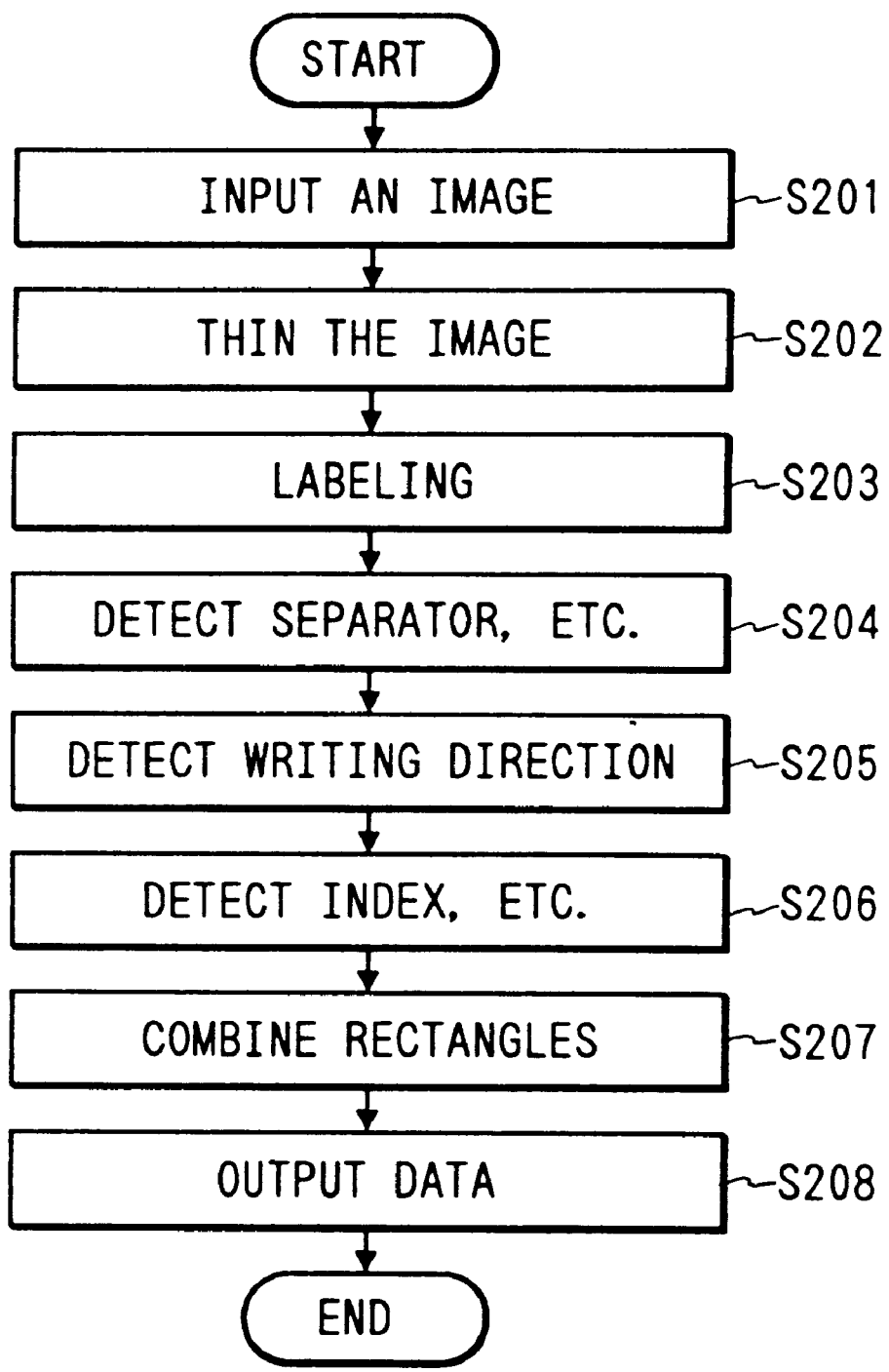
FIG. 2 is a flowchart showing a whole image processing procedure for the area division of an embodiment of the invention.

A flowchart of FIG. 2 shows an image processing procedure in the area divider 105 in FIG. 1. A control program for executing the above image process has been stored in the memory 103.

(1) step S201

An original image is input from the image input unit 101.

(2) step S202

In the image thinner 106, the OR of the vertical (m) dots and the horizontal (n) dots of the original image is calculated and the (m×n) pixels are thinned out, thereby newly forming one pixel. When a black pixel of at least one dot exists in the (m×n) pixels of the original image, the thinned-out pixel is set to black.

(3) step S203

In the labeler 107, a label is added to the black pixel of the thinned-out pixel for every line and the same label is added to the pixels which are continuous in the vertical, lateral, or oblique direction and, at the same time, the rectangle is traced.

Figures 3, 4:
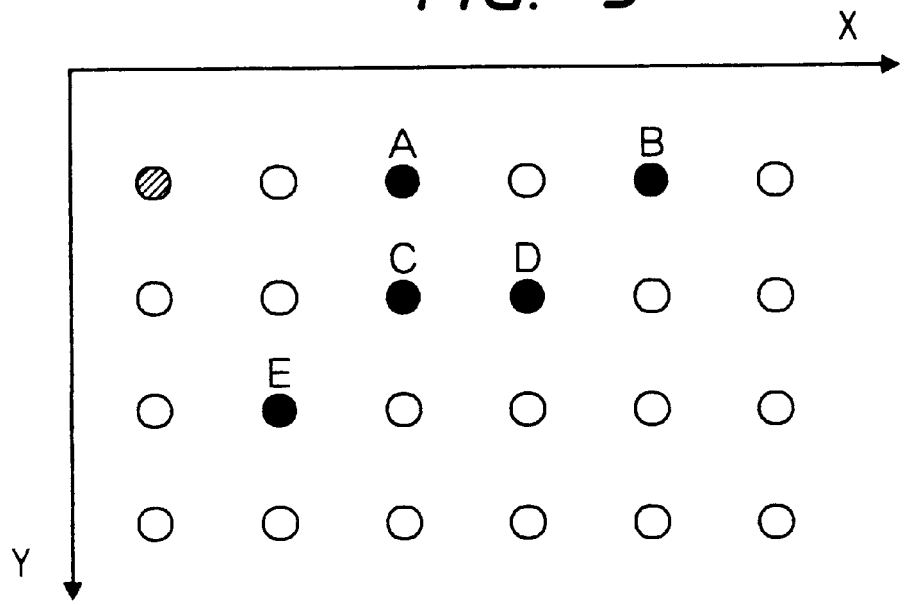
FIG. 3 is an explanatory diagram showing an example of a labeling process of an embodiment of the invention.
FIG. 4 is an explanatory diagram showing a structure of rectangle data in a memory unit of an embodiment of the invention.
Figure 5B:
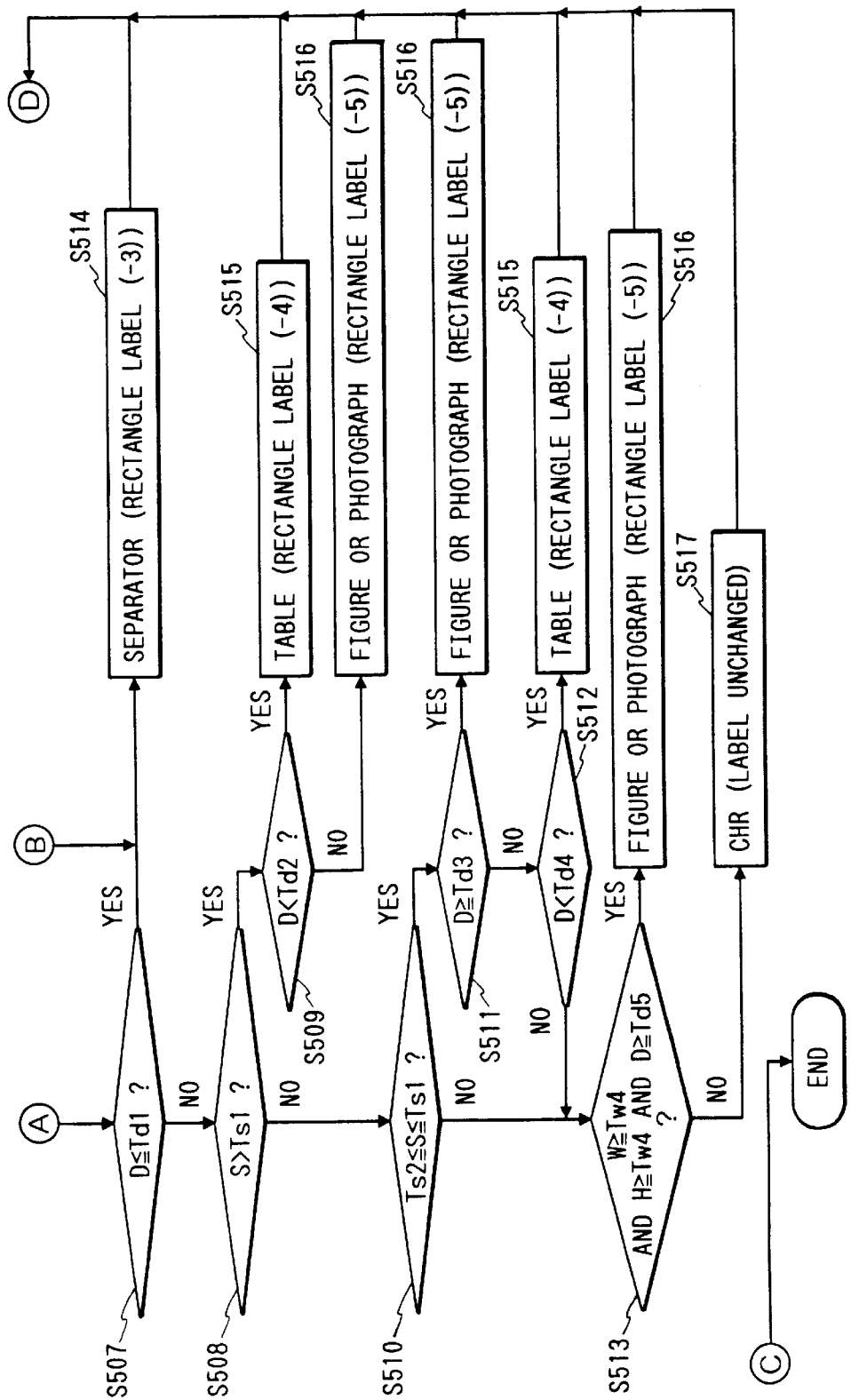
FIG. 5 is comprised of FIGS. 5A and 5B showing flowcharts of a processing procedure of a separator detector of an embodiment of the invention.

When describing FIG. 3 as an example, a label 1 is added to the pixel (A) which is first detected. The coordinates (Xa, Ya) of the pixel A are set to an initial point and a terminal point of the rectangle, the number of pixels is set to 1, the same label 1 as that of the pixel is added to a rectangle label to distinguish the rectangle, and the above data is stored as rectangle data into the memory 103 as shown in FIG. 4.

A label 2 added to a pixel B in which there is no continuous pixel in the left direction (since the pixel B is located on the first line, there is also obviously no continuous pixel from the upper line). The coordinates (Xb, Yb) of the pixel B are set to an initial point and a terminal point of the rectangle, the number of pixels is set to 1, the same label 2 as that of the pixel is added to the rectangle label to distinguish the rectangle, and the above data is also stored as rectangle data into the memory 103 as shown in FIG. 4.

After the labeling of the first line was finished as mentioned above, the processes progress to the second line.

Since the first pixel C of the second line is continuous with the pixel A of the label 1 from the upper line, the pixel label 1 is added to the pixel C. "1" is added to the number of pixels for the rectangle data of the rectangle label 1, so that the total number of pixels is equal to 2, the rectangle label is unchanged and is maintained to 1, and only the terminal point of the rectangle coordinates is updated from (Xa, Ya) to (Xa, Yc) (the coordinate of the initial point is unchanged).

Since the next pixel D is continuous with the pixel C from the left, the label 1 is added to the pixel D. "1" is added to the number of pixels for the rectangle data of the rectangle label 1, so that the total number of pixels is set at 3. The rectangle label is maintained to 1 without being changed. Only the terminal point of the rectangle coordinates is updated from (Xa, Yc) to (Xd, Yc) (the Y coordinate of the terminal point is unchanged). In this instance, both of the pixels D and B are obliquely continuous and are continuous with the pixel C, so that the label of the pixel B is changed from the label 2 to the label 1. The number of pixels of the rectangle label 2 is added to that of the rectangle data of the rectangle label 1, so that the total number of pixels is set to 4. The rectangle label is maintained at 1 without being changed. Only the terminal point of the rectangle coordinates is updated from (Xd, Yc) to (Xb, Yd) so as to include all of the pixels A, B, C, and D. With respect to the rectangle data of the rectangle label 2, it is invalidated by setting the rectangle label to 0.

After the labeling of the second line is finished as mentioned above, the processes progress to the third line.

Since the first pixel E of the third line is obliquely continuous with the pixel C, the pixel label 1 is added to the pixel E. "1" is added to the number of pixels for the rectangle data of the rectangle label 1, so that the total number of pixels is set to 5. The rectangle label is maintained at 1 without being changed. As for the rectangle coordinates, the initial point is updated from (Xa, Ya) to (Xe, Ya) and the terminal point is updated from (Xb, Yd) to (Xb, Ye). Namely, in the rectangle data in FIG. 4 in the memory 103 in this instance, the rectangle label is set to 1, the initial point coordinates are set to (Xe, Ya), the terminal point coordinates are set to (Xb, Ye), the pixel label is set to 1, and the number of pixels is set to 5.

In a manner similar to the above, the labeling is executed for all of the thinned-out pixels and the tracing of the rectangle is performed.

(4) step S204

After completion of the above labeling and tracing of the rectangle, the separator detector 108 distinguishes a rectangle corresponding to the character portion (body), a rectangle corresponding to the figure, photograph, table, and a rectangle corresponding to the separator by using the width W of the rectangle, height H, area S, and the number of pixels for the area, namely, the pixel density D (which can be easily obtained by calculating using those rectangle data). The above processes will now be described in detail hereinbelow with reference to the flowcharts of FIGS. 5A and 5B.

With respect to the separator, when the width W is equal to or less than a threshold value Tw1 and the height H is equal to or larger than the value which is twice as large as a threshold value Tw2 of the width W (step S503) or when the width W is larger than the threshold value Tw1 and the height H is equal to or larger than the value which is three times as large as threshold value Tw3 of the width W (step S504), the separator is regarded as a separator which is long vertically and is unified by setting the rectangle label in the memory 103 to −3 and the pixel label constructing the rectangle keeps the current label number separately from the rectangle label (step S514).

A rectangle in which the above width and height were replaced is also judged in a manner similar to the above (steps S505, S506). If YES in each of the steps S505 and S506, the separator is regarded as a separator which is long horizontally and the rectangle label is changed to −3.

Figure 6:
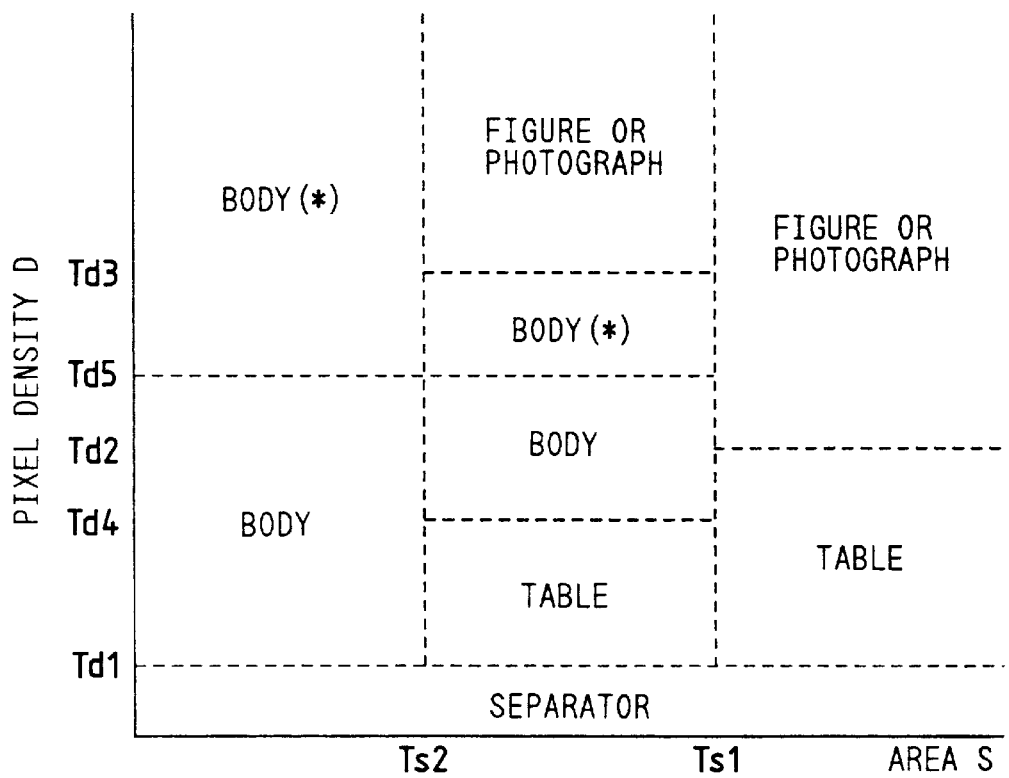
FIG. 6 is an explanatory diagram showing cutting processes based on a density D and an area S of the attributes of a rectangle (area) of an embodiment of the invention.
Figure 7:
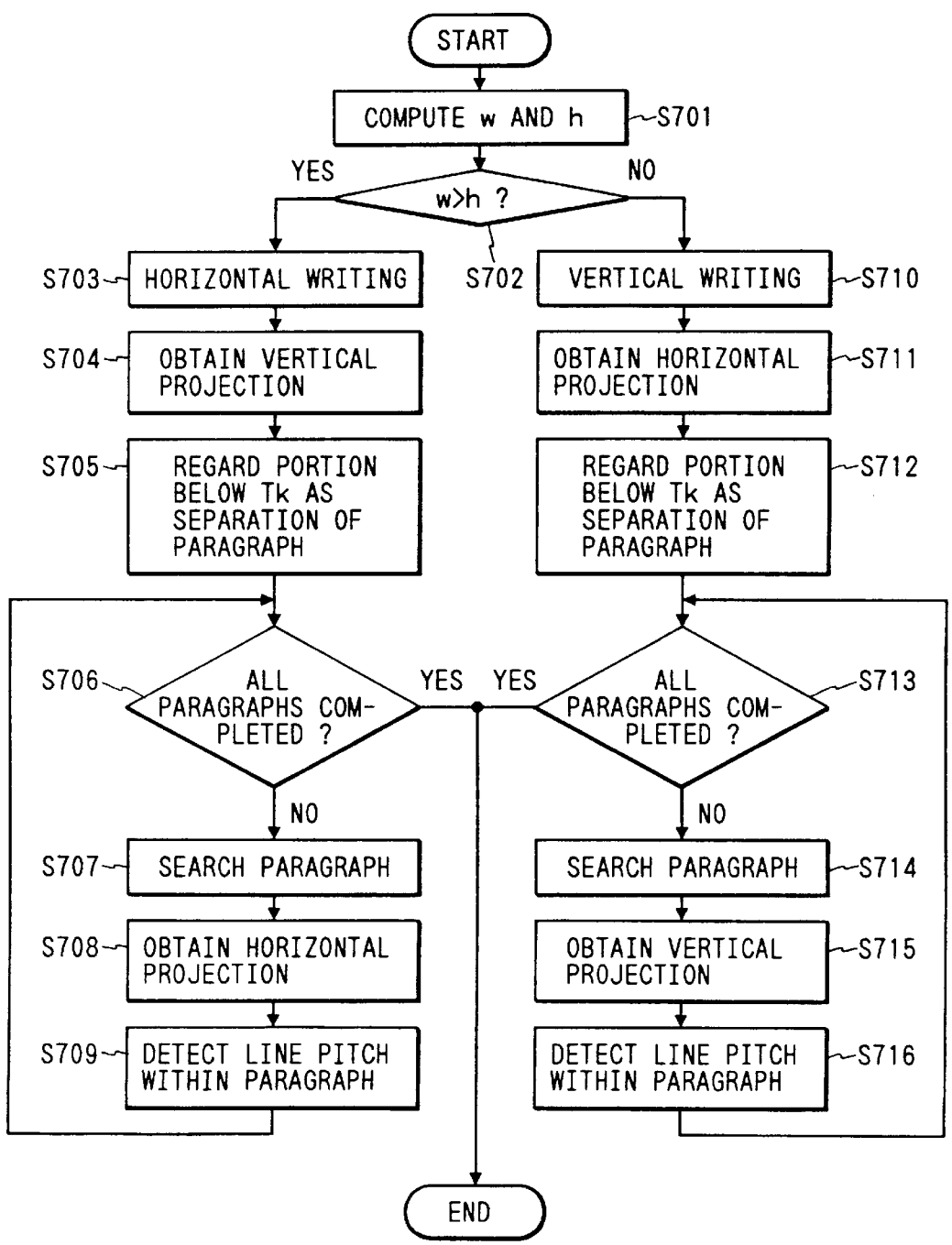
FIG. 7 is a flowchart showing a processing procedure of a writing direction detector of an embodiment of the invention.

As shown in FIG. 6, if the determination is NO in all of steps S503 to S506 and when the pixel density D is equal to or less than a threshold value Td1 (step S507), the separator is regarded as a modified separator such as a key-shape or the like and the rectangle label is set to −3 (step S514).

If NO in step S507 and when the area S is larger than a threshold value Ts1 (step S508), so long as the pixel density D is less than a threshold value Td2 (step S509), the rectangle is regarded as a table and the rectangle label is changed to −4 (step S515). When the pixel density D is equal to or larger than the threshold value Td2, the rectangle is regarded as a figure or photograph and the rectangle label is changed to −5 (step S516).

A rectangle in which the pixel density D is equal to or larger than a threshold value Td3 (step S511) when the area S is equal to or less than the threshold value Ts1 and is equal to or larger than a threshold value Ts2 (step S510) or a rectangle in which both of the width W and the height H are equal to or larger than a threshold value Tw4 and the pixel density D is equal to or larger than a threshold value Td5 (step S513) is also regarded as a figure or photograph and the rectangle label is changed to −5 (step S516).

Further, a rectangle in which the pixel density D is less than a threshold value Td4 (step S512) when the area S is equal to or less than the threshold value Ts1 and is equal to or larger than the threshold value Ts2 (step S510) is regarded as a table and the rectangle label is changed to −4 (step S515).

As mentioned above, a rectangle corresponding to a figure, photograph, or table, and a rectangle corresponding to a separator is detected. The remaining rectangle is regarded as a body (character portion), and the rectangle label is unchanged and is set to the same label as the pixel label (step S517). FIG. 6 shows the relation between the above threshold values in case of the area S and pixel density D and the classification of the separator.

(5) step S205

The writing direction detector 109 detects the writing direction of a sentence such as a vertical writing or horizontal writing. The writing direction detecting process will now be described with reference to a flowchart of FIG. 7.

In case of a horizontal writing sentence, the rectangle remaining as a body easily becomes a rectangle which is long laterally because the pixels which were thinned out in the lateral direction are continuous. In a case of a vertical writing sentence, the rectangle remaining as a body easily becomes a rectangle which is long vertically. Therefore, in the writing direction detector 109, the average values (w and h) of the width W and height H of the rectangle of the body are calculated (step S701). When the average width w is larger than the average height h, the sentence is regarded as a sentence having a large amount of horizontal writing sentences and the average height h is set to a character size of one character (steps S702, S703). On the contrary, when the average height h is larger than the average width w, the sentence is regarded as a sentence having a large amount of vertical writing sentences and the average width w is set to a character size of one character (steps S702, S710).

Figure 8:
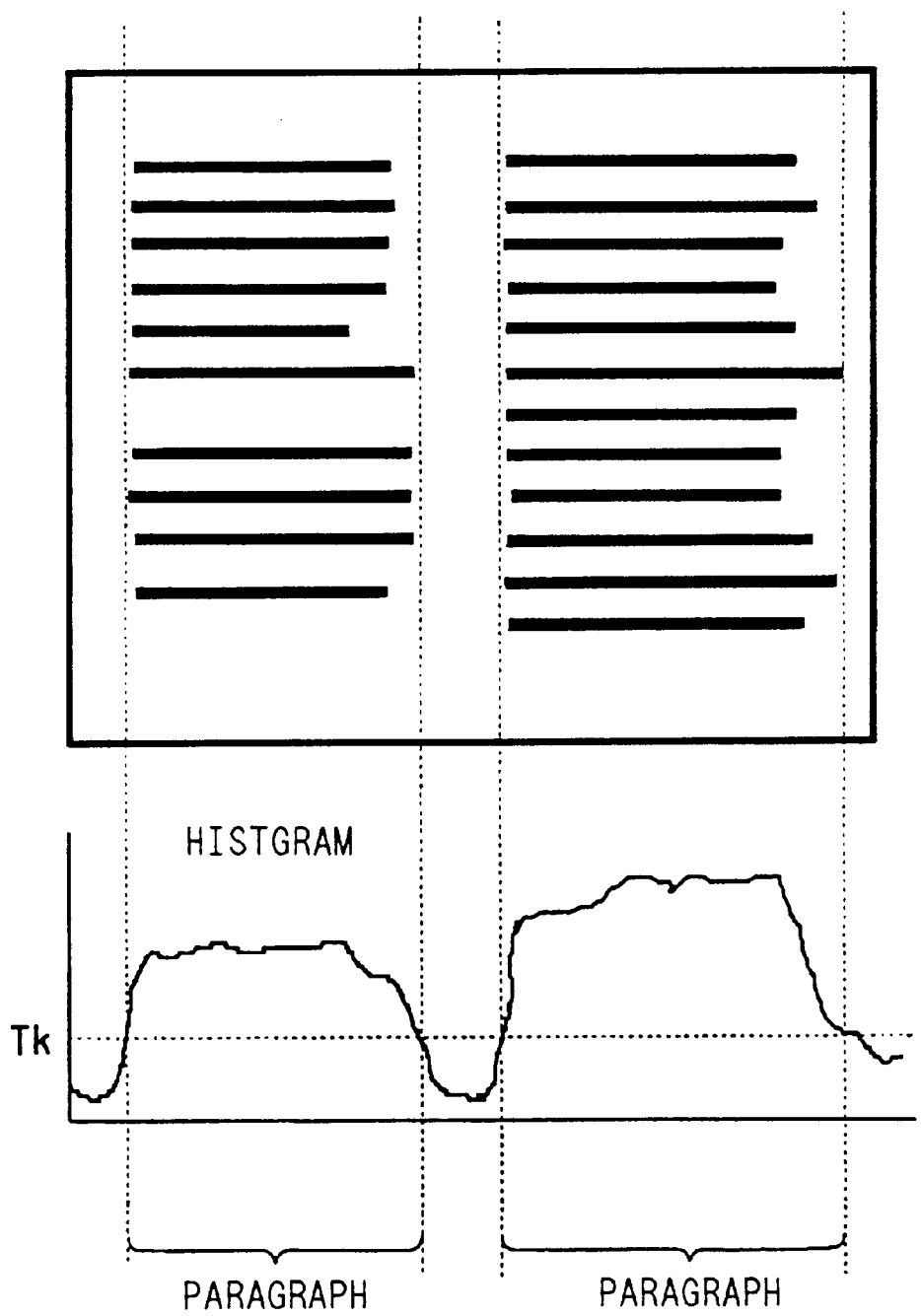
FIG. 8 is an explanatory diagram showing an example of a detecting process of a paragraph of an embodiment of the invention.
Figure 9:
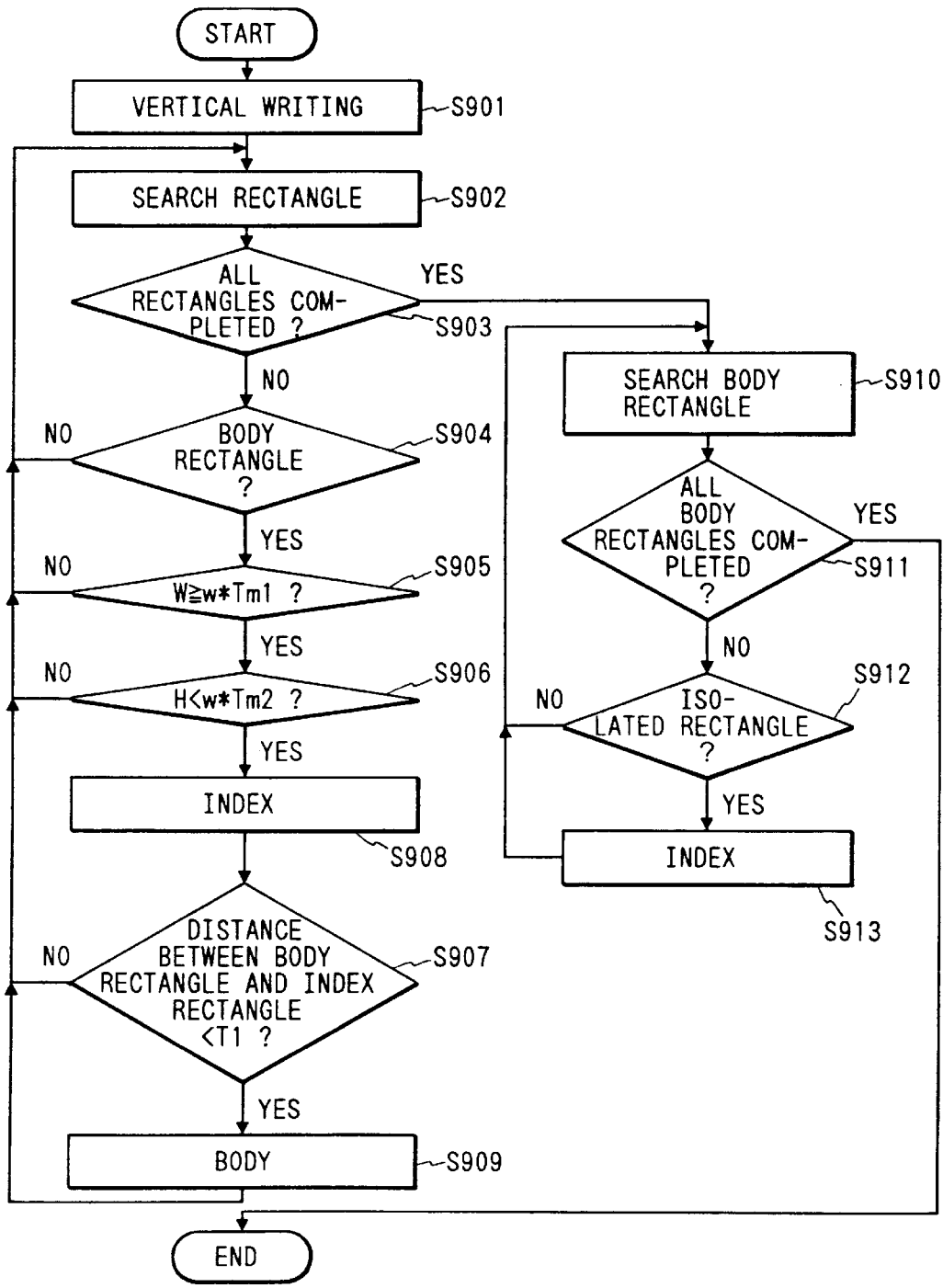
FIG. 9 is a flowchart showing a processing procedure of an index detector of an embodiment of the invention.

As shown in FIG. 8, a histogram of rectangles is obtained in the direction opposite to the writing direction (steps S704, S711). A position below a threshold value Tk is set to a separation of a paragraph from the shape of a peripheral distribution (steps S705, S712). A histogram of the rectangles is obtained every paragraph in the same direction as the writing direction (steps S708, S715). A length of continuous black pixels is set to a character size within the paragraph from the shape of the peripheral distribution and a length of continuous white pixels is detected as a line pitch (steps S709, S716). The above detecting process is repeated until the end of the paragraph (steps S706, S713).

(6) step S206

In the index detector 110, an index is detected from the writing direction and the character size. As shown in a flowchart of FIG. 9, when considering the case of the vertical writing as an example, a rectangle whose width W is equal to or larger than the value of a threshold value Tm1 X the character size w is detected as a candidate of the index rectangle from the body rectangle (step S905). Further, when the height H of rectangle is smaller than the value of (a threshold value Tm2) times of the character size w (step S906), a sentence is regarded as a sentence in which the horizontal written characters are continuous and such a sentence is regarded as an index (step S908).

Since there is a case where a rectangle in which characters of a body were combined is also included in the rectangles which were regarded as indices from the size of rectangle as mentioned above, with respect to the rectangle in which the distance between the body rectangle and the index rectangle is closer than a threshold value T1 (step S907), it is corrected from the index to the body (step S909).

Among the body rectangles remaining by the above processes, a rectangle such that none of the rectangles of the body and index exists within a range of the character size w is set into an index as an isolated rectangle (steps S910 to S913).

(7) step S207

In the rectangle combiner 111, the rectangles corresponding to the bodies which exist at random without any relation and the rectangles of the indices are combined.

Figure 10:
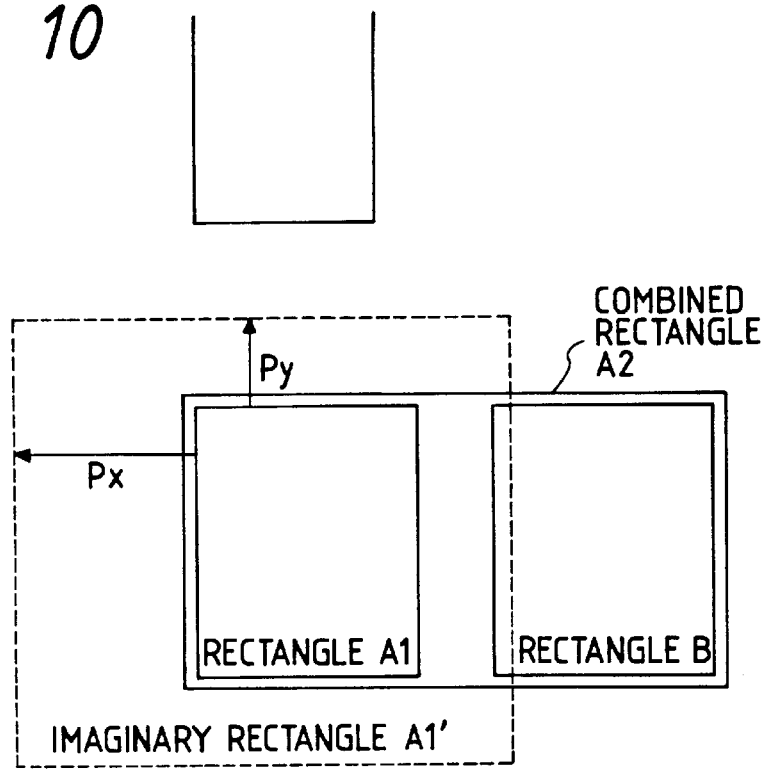
FIG. 10 is an explanatory diagram showing an example of a combining process of rectangles of an embodiment of the invention.

An example is shown in FIG. 10. The combination of rectangles A1 and B will now be considered. An imaginary rectangle A1' which is obtained by enlarging the rectangle A1 by only Px in the X direction and by only Py in the Y direction is now considered. The periphery of the rectangle A1' is searched to see if there is a rectangle which comes into contact with or is inscribed in the rectangle A1' or not. When a rectangle which is in contact with A1' exists like a rectangle B, by combining the rectangles A1 and B, a combined rectangle A2 is newly formed. By updating the rectangle data of the rectangle A1, the updated data is stored and the data of the rectangle B is invalidated. In this instance, the values of Px and Py are obtained from the character size and line pitch. In the case where the rectangle formed by combining the rectangles comes into contact with a figure, table, separator, or the like, the combining process itself is invalidated and the original rectangles are maintained as they are.

As mentioned above, the indices are first combined and the body rectangles are subsequently combined. In this instance, in case of combining the bodies, the rectangle is prevented from coming into contact with not only a figure, table, or separator but also an index. When the rectangle comes into contact with the index, the combining process itself is invalidated and the original rectangles are maintained as they are.

(8) step S208

Finally, the rectangle data of various kinds of areas obtained as mentioned above is generated from the output unit 104 to the outside together with the image data.

In the image input process in step S201 in FIG. 2 mentioned above, by judging whether the input image has multivalues or not and by converting the input image into a binary image, the area dividing process can also be executed even when the input image is a multivalue image such as a color image or the like.

In the image thinning process in step S202, when the number of pixels of the input image is sufficiently small to be a value which doesn't decrease the processing speed, such an image thinning process can also be omitted.

In the detection of a separator or the like in step S204, by distinguishing the rectangle label in dependence on a difference between the vertical and lateral directions of the separator, a difference between the threshold values when obtaining a figure, table, etc., the further fine area attributions can be classified.

Likewise, in the detection of a separator in step S204, in the case where only an image of a special attribute is input from the beginning as in a sentence, the detecting process of a separator can also be omitted.

In the detection of the writing direction in step S205, in place of obtaining the average width and average height, by obtaining the most frequent values, those values can also be used.

Similarly, in the detection of the writing direction in step S205, by again confirming the writing direction in every paragraph, the processes can also be accurately executed to an original in which the vertical writing sentences and the horizontal writing sentences mixedly exist.

In the detection of the writing direction in step S205, when only the sentences in a predetermined writing direction are input from the beginning, by setting the writing direction to a fixed value, such a detecting process can be replaced.

In the index detection in step S206, when only the image having no index is input from the beginning, such a detecting process can also be omitted.

Figure 11:
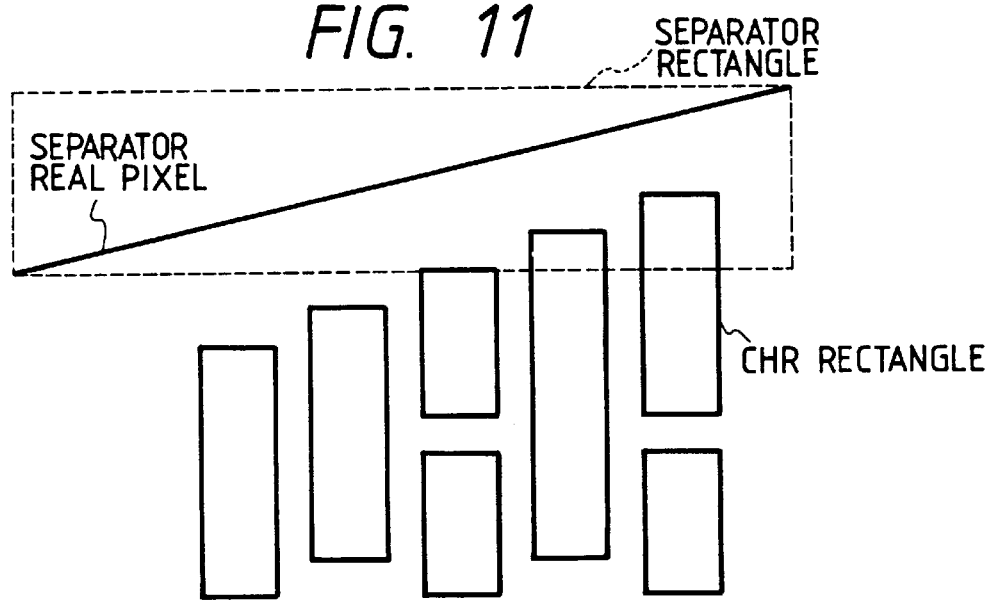
FIG. 11 is an explanatory diagram showing an example of a combining process of separator rectangles of another embodiment of the invention.

In the combining process of the rectangles in step S207, as shown in FIG. 11, when a rectangle comes into contact with a rectangle such as a separator, a check is further made to see if the rectangle is also in contact with the actually thinned-out pixel or not, and when the rectangle is not in contact with such a pixel, by executing the combining process, the apparatus can also cope with a slanted image.

Likewise, in the combining process of rectangles in step S207, in the case of an image such that the number of pixels is so small that the image thinning process can be omitted, such a combining process can also be omitted.

In the last output process in step S208, only the image data of a necessary area can also be generated with reference to the rectangle data of various kinds of areas, so that the memory area and the processing time can further be reduced.

Embodiment 2

A preferred second embodiment of the invention will now be described with reference to FIGS. 12 to 40.

Figure 12:
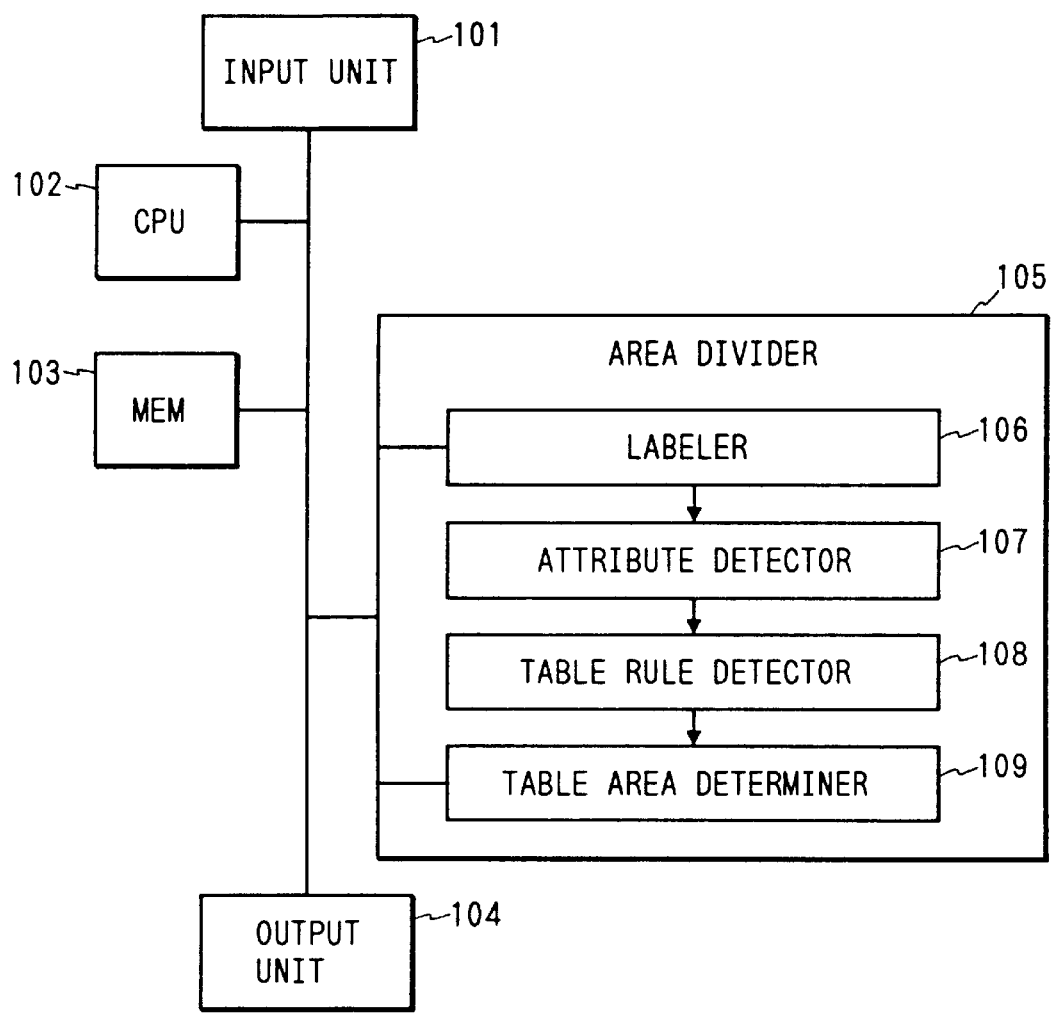
FIG. 12 is a block diagram showing a schematic construction of an image processing apparatus of an embodiment 2.

FIG. 12 is a block diagram showing an image processing apparatus of the embodiment.

In the diagram, reference numeral 101 denotes the input unit for inputting image data.

Reference numeral 102 denotes the central processing unit (CPU) to control the apparatus and execute an arithmetic operation of the process in each unit in accordance with the control programs stored in the memory 103.

Reference numeral 103 denotes the memory to store the control programs as shown in the flowcharts, which will be explained hereinlater, and various kinds of data. The memory 103 includes a ROM and a RAM.

Reference numeral 104 denotes an output unit to generate the results of arithmetic operating processes, the results of image processes, and image data.

Reference numeral 105 denotes an area divider showing the complete area dividing process.

Reference numeral 107 denotes a labeler for adding a label to the pixels of the input image and for simultaneously forming initial rectangle data.

Reference numeral 207 denotes an attribute detector to detect the attribute of a separator, a table or a figure.

Reference numeral 208 denotes a table rule detector to detect straight lines constructing a table.

Reference numeral 209 denotes a table area determiner to determine whether an area is a table area or not from a state of the table rules.

Figure 13:
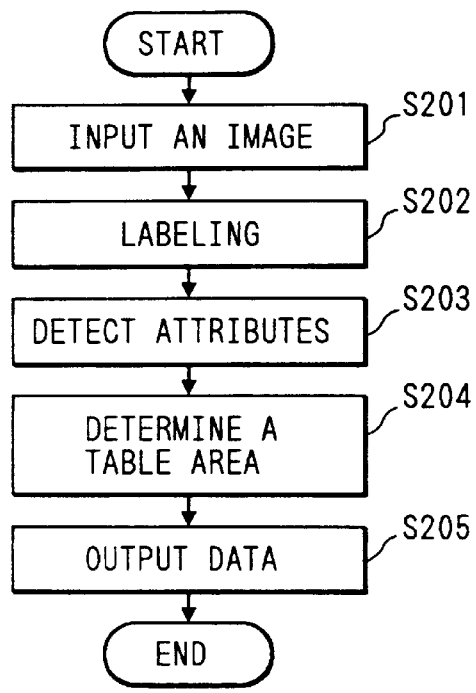
FIG. 13 is a flowchart showing an image process in the image processing apparatus of the embodiment 2.

FIG. 13 is a flowchart showing the image process in the image processing apparatus of the embodiment. The control programs to execute the image process are stored in the memory 103.

(step S201)

The original image is first input from the image input unit 101.

(step S202)

In the labeler 107, the labels are added to the black pixels of the thinned-out image for every line and the same label is added to the pixels which are continuous in the vertical, lateral, and oblique directions, thereby simultaneously tracing a rectangle.

Figure 14:
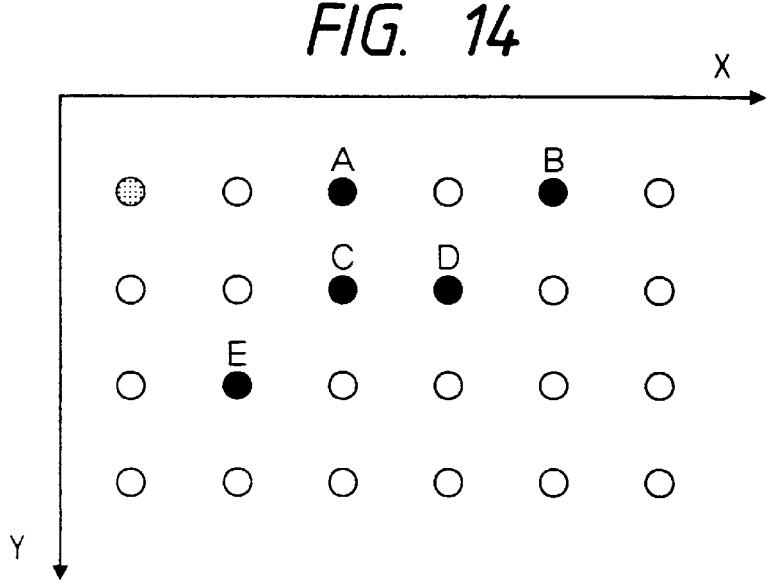
FIG. 14 is a diagram showing an example of a labeling process of the embodiment 2.

When describing FIG. 14 as an example, the label 1 is added to a pixel A which is first detected. The coordinates (Xa, Ya) of the pixel A are set to an initial point and a terminal point of the rectangle, the number of pixels is set to 1, the same label as that of the pixels is added to the rectangle label to distinguish the rectangle, and the above data is stored into the memory as rectangle data (FIG. 15).

Subsequently, the label 2 is added to a pixel B such that there is no continuous pixel in the left direction (since the pixel B is located on the first line, there is also no continuous pixel from the upper line). The coordinates (Xb, Yb) of the pixel A are set to an initial point and a terminal point of the rectangle. The number of pixels is set to 1 and the same label 2 as that of the pixels is added to the rectangle label to distinguish the rectangle. The above data is also stored into the memory as rectangle data (FIG. 15).

After completion of the labeling of the first line as mentioned above, the processes progress to the second line.

Since a first pixel C of the second line is continuous with the pixel A of the label 1 from the upper line, the pixel label 1 is added to the pixel C. "1" is added to the number of pixels for the rectangle data of the rectangle label 1, so that the total number of pixels is set to 2. The rectangle label is maintained at 1 without being changed. Only the terminal point of the rectangle coordinates is updated from (Xa, Ya) to (Xa, Yc) (the coordinates of the initial point are unchanged).

Since a next pixel D is continuous with the pixel C from the left side, the label 1 is added. "1" is added to the number of pixels for the rectangle data of the rectangle label 1, so that the total number of pixels is set to 3. The rectangle label is maintained at 1 without being changed. Only the terminal point of the rectangle coordinates is updated from (Xa, Yc) to (Xd, Yc) (the Y coordinate of the end point is unchanged).

In this instance, the pixel D is also obliquely continuous with the pixel B and continuously comes from the pixel C, so that the label of the pixel B is changed from the label 2 to the label 1. The number of pixels of the rectangle label 2 is added to that of the rectangle data of the rectangle label 1, so that the total number of pixels is set to 4. The rectangle label is maintained to 1 without being changed. Only the terminal point of the rectangle coordinates is updated from (Xd, Yc) to (Xb, Yd) so as to include all of the pixels A, B, C, and D. The rectangle data of the rectangle label 2 is invalidated by setting the rectangle label to 0.

After completion of the labeling for the second line as mentioned above, the processes progress to the third line.

Since a first pixel E of the third line is obliquely continuous with the pixel C, the pixel label 1 is added and "1" is added to the number of pixels for the rectangle data of the rectangle label 1, so that the total number of pixels is set to five. The rectangle label is maintained at 1 without being changed. The initial point of the rectangle coordinates is updated from (Xa, Ya) to (Xe, Ya) and the terminal point is updated from (Xb, Yd) to (Xb, Ye).

In a manner similar to the above, the labeling and tracing of the rectangle are executed for all of the thinned-out pixels. (step S203)

In the attribute detector 207, after completion of the labeling and the tracing of the rectangle, a rectangle corresponding to the body, a rectangle corresponding to a figure, photograph, table, and a rectangle corresponding to a separator are distinguished by using the width W of the rectangle, height H, area S, and the number of pixels for the area, namely, the pixel density D (those data can be easily obtained by calculating the rectangle data).

When the width W is equal to or less than the threshold value Tw1 and the height H is equal to or larger than (the threshold value Tw2) times the width W (S503 in FIG. 16A), or when the width W is larger than the threshold value Tw1 and the height H is equal to or larger than (the threshold value Tw3) times the width W (S504 in FIG. 16B), the separator is regarded as a separator which is long vertically and is unified by setting the rectangle label to −3, and the pixel labels constructing the rectangle is maintained as it is separately from the rectangle label (S514 in FIG. 16B).

In a manner similar to the above separator in which the width and height were replaced (S505 and S506 in FIG. 16A), the separator is regarded as a separator which is long horizontally and the rectangle label is changed to −3.

Figure 17:
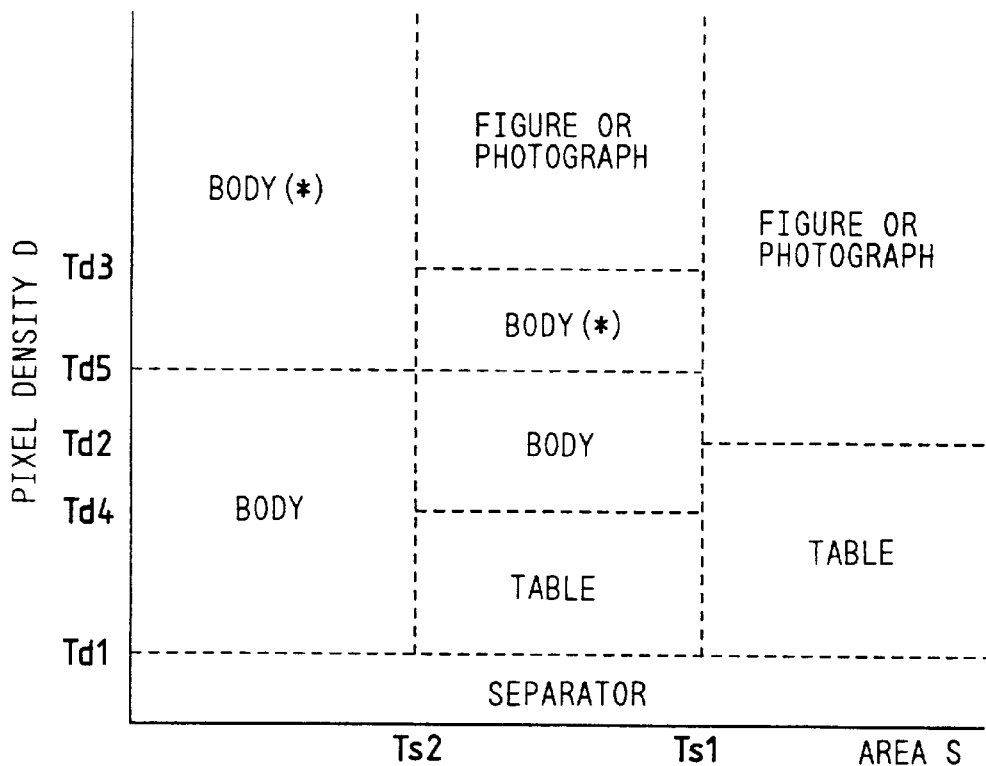
FIG. 17 is a diagram showing cutting processes based on a density D and an area S of the attribute of a rectangle (area) of the embodiment 2.

As shown in FIG. 17, when the pixel density D is equal to or less than the threshold value Td1 (S507 n FIG. 16B), the separator is regarded as a modified separator such as key-shaped or the like and the rectangle label is changed to −3 (S514 in FIG. 16B).

When the area S is larger than the threshold value Ts1 (S508 in FIG. 16B), so long as the pixel density D is less than the threshold value Td2 (S509 in FIG. 16B), the area is regarded as a table and the rectangle label is changed to −4 (S515 in FIG. 16B). When the pixel density D is equal to or larger than the threshold value Td2, the rectangle is regarded as a figure or photograph and the rectangle label is changed to −5 (S516 in FIG. 16B).

A rectangle when the pixel density D is equal to or larger than the threshold value Td3 (S511 in FIG. 16B) when the area S is equal to or less than the threshold value Ts1 and is equal to or larger than the threshold value Ts2 (S510 in FIG. 16B) or a rectangle when the width W and height H are equal to or larger than the threshold value Tw4 and the pixel density D is larger than Td5 (S513 in FIG. 16B) is also regarded as a figure or a photograph, and the rectangle label is changed to −5
(S515 in FIG. 16B).

Further, when the area S is equal to or less than the threshold value Ts1 and is equal to or larger than the threshold value Ts2 (S510 in FIG. 16B), a rectangle in which the pixel density D is less than a threshold value Td4 (S512 in FIG. 16B) is regarded as a table and the rectangle label is changed to −4
(S515 in FIG. 16B).

In a manner similar to the above, a rectangle corresponding to a figure, photograph, table, and a rectangle corresponding to the separator are detected, and the remaining rectangles are regarded as bodies and the rectangle label is maintained and is set to the same pixel label (S517 in FIG. 16B).

(step S204)

Subsequently, in the table area determiner 208, a width when calculating a histogram is decided from the width W and height H of the rectangle which was determined to be a table area (S901 in FIG. 20).

Partial histograms of the left and right edges in the vertical and horizontal directions are calculated (S902 in FIG. 20) for only the pixels (701 in FIG. 18, 801 in FIG. 19) (they can be easily obtained by comparing and selecting the pixel label of the rectangle data and the pixel label of each pixel in the rectangle) corresponding to the table frame excluding the bodies (702 in FIG. 18, 802 in FIG. 19) in the rectangle which was determined to be a table area. A threshold value Tkh of a histogram regarding whether a line is a table frame line which is parallel with the Y axis or not from the height of the rectangle and a threshold value Tkw of a histogram regarding whether a line is a table frame line which is parallel with the X axis or not from the width of rectangle are determined (S903, S904 in FIG. 20).

Figure 20:
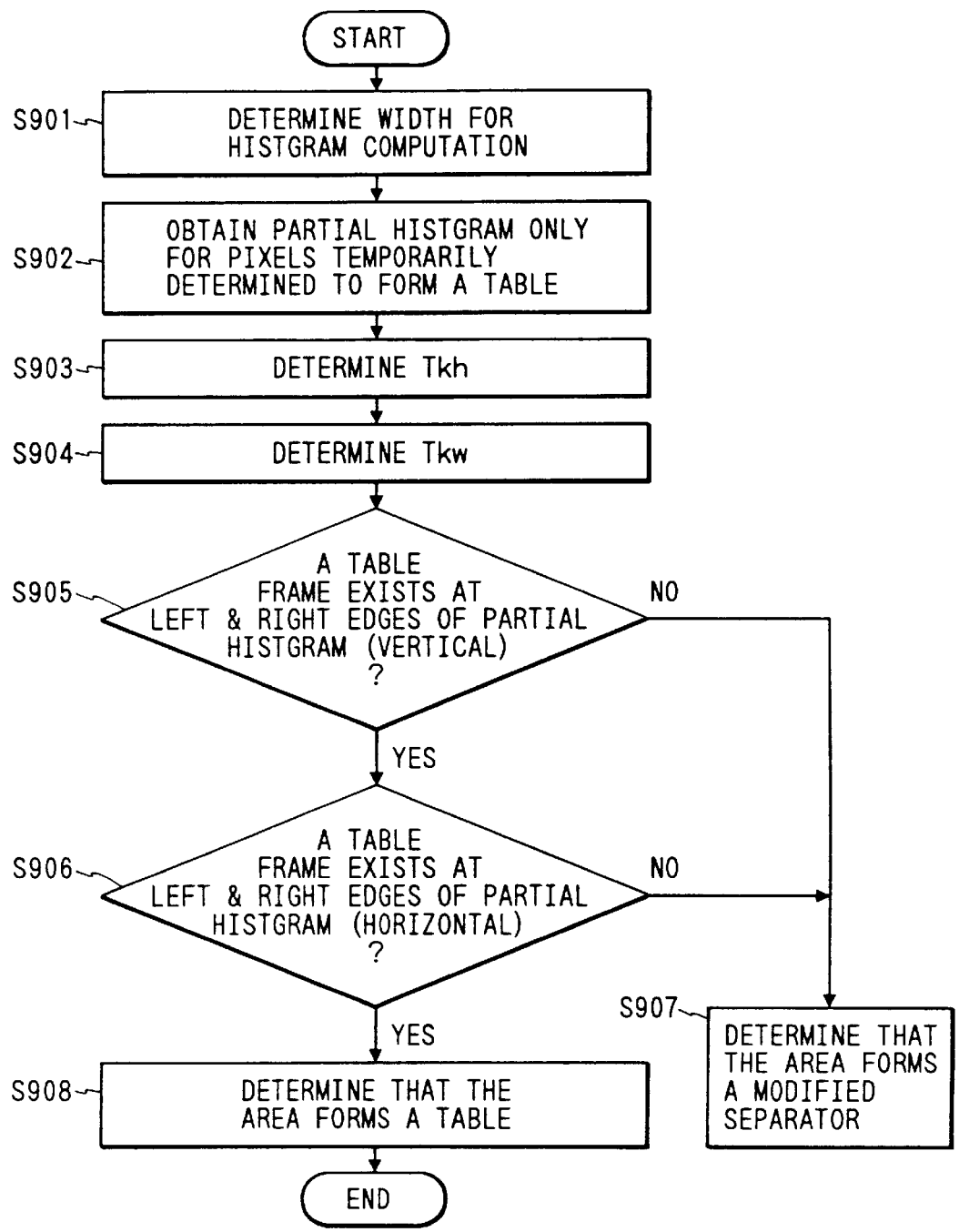
FIG. 20 is a flowchart showing an example of processes of a table area determiner of the embodiment 2.

In the case where the portions corresponding to the table frame line exist at the left and right edges of both of the partial histograms in the horizontal and vertical directions (namely, in the case where frame lines of the table exist at the left and right edges and the top and bottom edges of the rectangle), the corresponding rectangle is determined to be a table area (S905, S906, S908 in FIG. 20).

In the case where the portion corresponding to the table frame line lacks even at one of the left and right edges of both of the partial histograms in the horizontal and vertical directions (namely, even either one of the left and right edges or even either one of the upper and lower edges lacks), the corresponding rectangle is determined as a modified separator area (S905, S906, and S907 in FIG. 20).

(step S205)

Finally, the rectangle data of various kinds of areas which was obtained as mentioned above is generated from the output unit 104 together with the image data.

In the image input in step S201, by judging whether the input image is a multivalue image or not and converting the input image into the binary image, the area dividing process can be executed even when the input image is a multivalue image such as a color image.

In the image input step S201, when the number of pixels of the input is so large that an extremely long processing time is necessary, the processing speed can be raised by the image thinning process for thinning out the image of (m dots in the vertical direction)×(n dots in the horizontal direction), thereby newly forming one pixel.

In the detection of a separator in step S203, by distinguishing the rectangle labels by a difference between the vertical and horizontal directions of the separator, a difference between the threshold values when obtaining a figure, a table, etc., the further detailed area attributes can also be classified.

Figure 21:
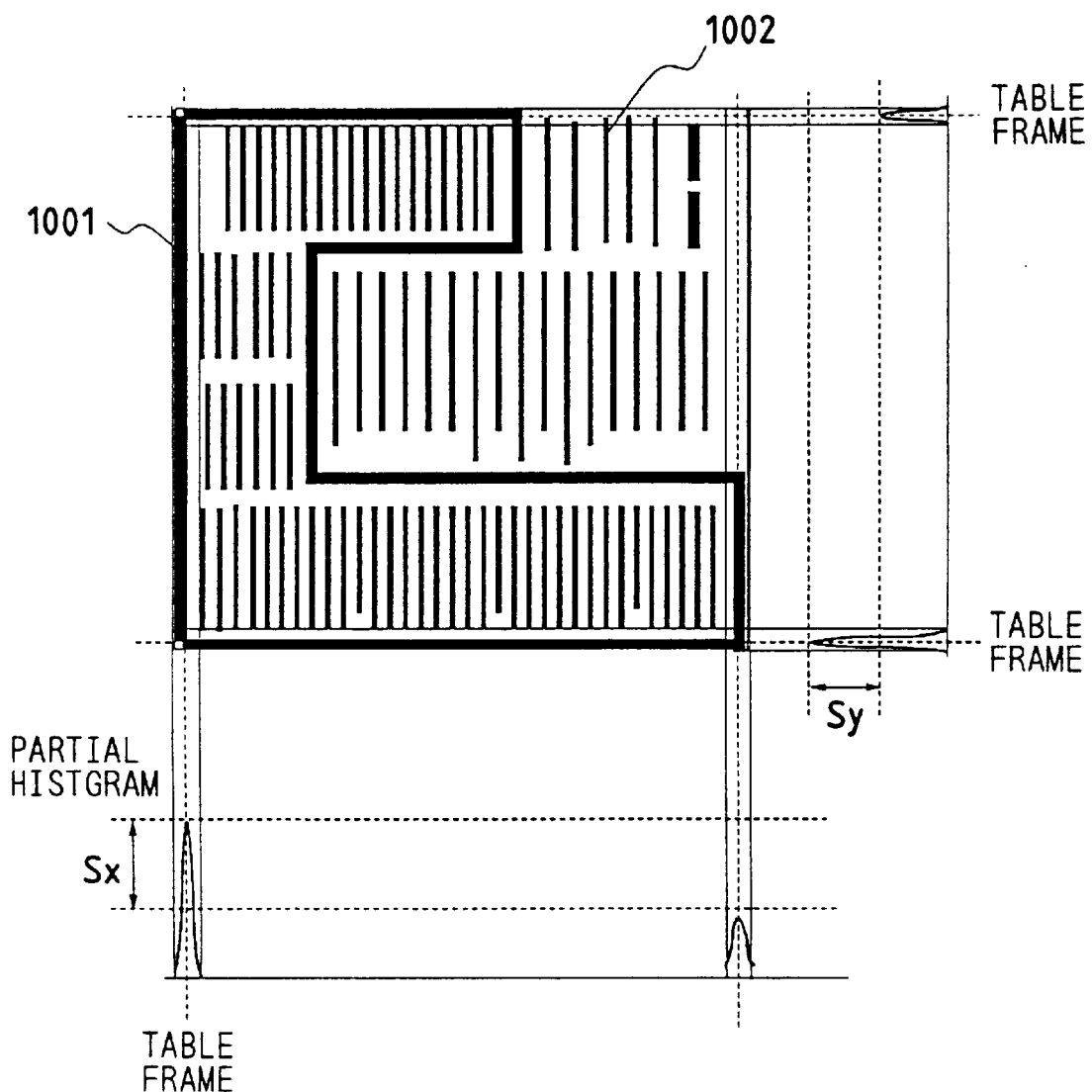
FIG. 21 is a diagram showing a histogram when an area is determined to be a modified separator area of the embodiment 2.
Figure 22:
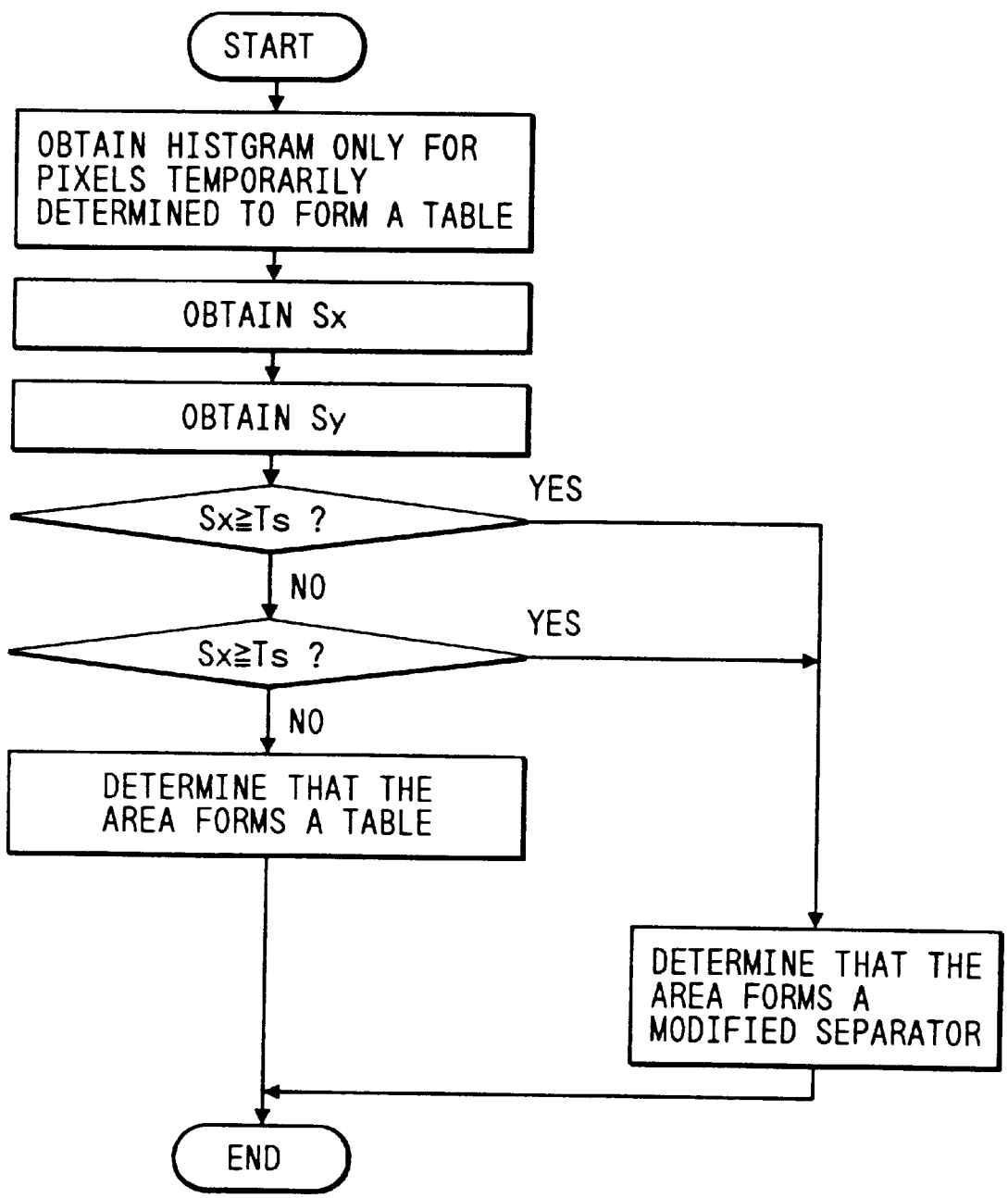
FIG. 22 is a flowchart showing an example of processes of the table area determiner of the embodiment 2.

In the determination of the table area in step S204, as shown in FIGS. 21 and 22, a difference Sx between the histograms at the left and right edges and a difference Sy between the histograms at the upper and lower edges are respectively obtained. When either one of the differences is equal to or larger than a threshold value Ts, it is decided that the length of rules are not uniform, so that it is determined that the area is a modified separator area. When either one of the differences is less than the threshold value Ts, it is decided that the area is a table area. By such a method, they can be replaced.

In the last output in step S206, only the image data of the necessary area can also be generated with reference to the rectangle data of various kinds of areas. The memory area and the processing time can be further reduced.

In the above description, the histograms of the upper, lower, right, and left edges of the area whose attribute was judged as a table have been used as a method of determining the table area. An explanation will now be made with respect to an example in which histograms of the whole area which was determined to be a table are obtained and the rules are detected and the table area is decided on the basis of the number of rules.

Figure 23:
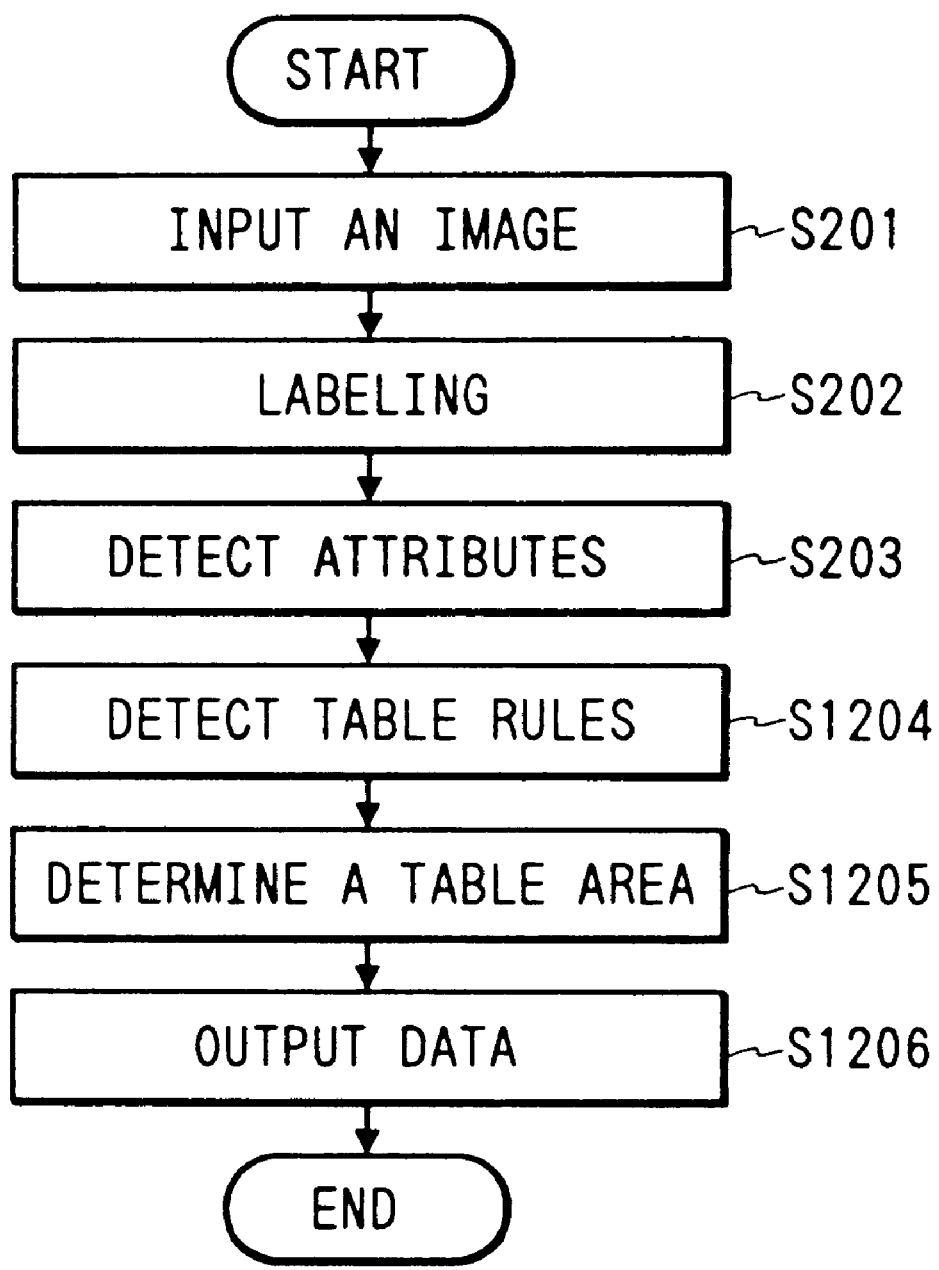
FIG. 23 is a flowchart showing an image process in the image processing apparatus of the embodiment 2.

The process in the above example is shown in a flowchart of FIG. 23. Processing steps similar to those in the flowchart of FIG. 13 described before are designated by the same step numbers and their descriptions are omitted here.
(step S1204)

Subsequently, in the table rule detector 208, histograms are calculated in the vertical and horizontal directions (S1501 in FIG. 26) for only the pixels (701 in FIG. 24, 801 in FIG. 25) (they can be easily obtained by comparing and selecting the pixel label of the rectangle data and the pixel label of each pixel in the rectangle) corresponding to the table frame excluding the bodies (702 in FIG. 24, 802 in FIG. 25) in the rectangle which was determined to be a table area. The threshold value Tkh of the histogram regarding whether the rules are parallel with the Y axis or not from the height of rectangle and the threshold value Tkw of the histogram regarding whether the rule is parallel with X axis or not from the width of rectangle are then obtained (S1502 and S1503 in FIG. 26).

Figure 26:
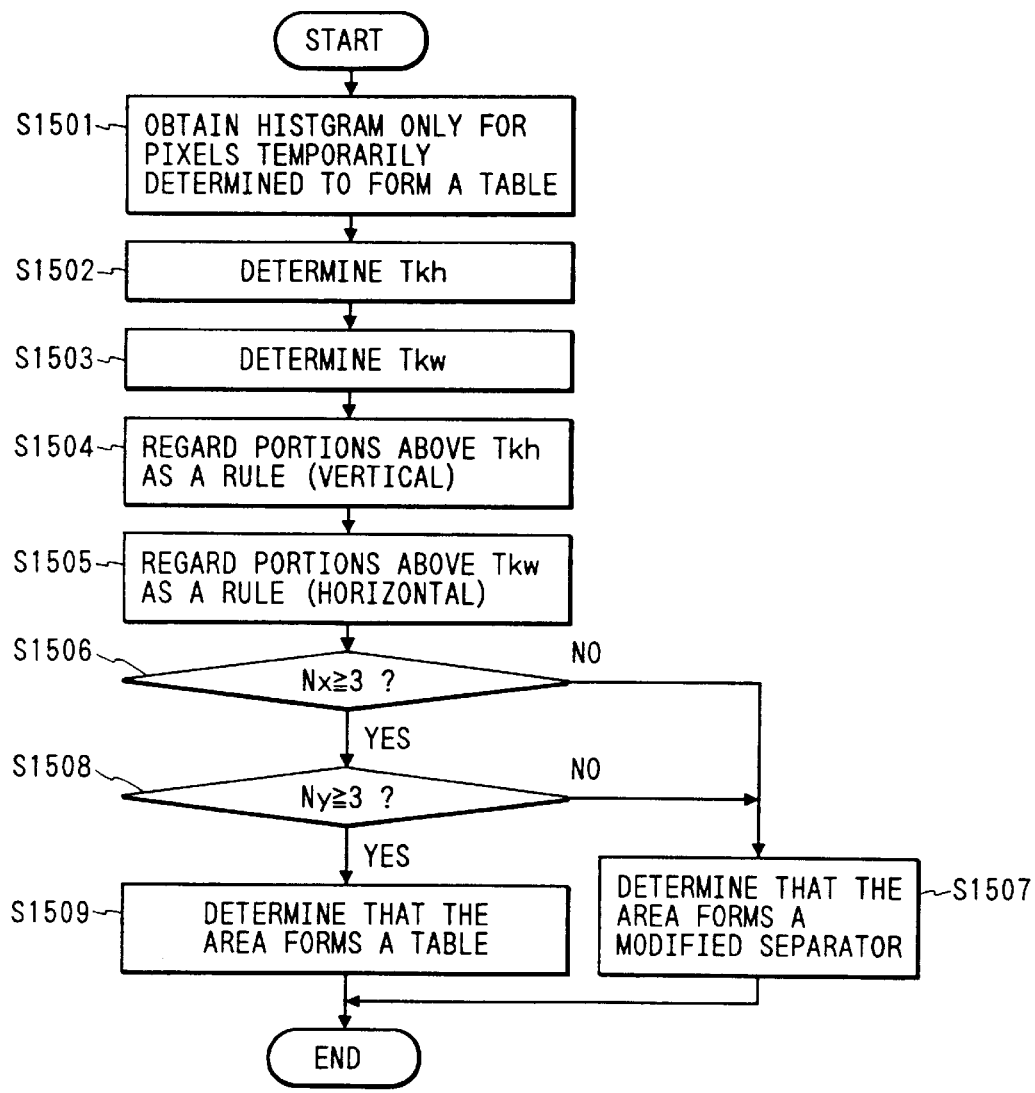
FIG. 26 is a flowchart showing an example of processes of a table rule detector and the table area determiner of the embodiment 2.

The position above the threshold value Tkh is regarded as a rule of the table area from the shape of the histogram in the vertical direction (S1504 in FIG. 26). The position above the threshold value Tkw is similarly regarded as a rule of the table area from the shape of the histogram in the horizontal direction (S1505 in FIG. 26).
(step S1205)

The number Nx of vertical rules obtained from the histogram in the vertical direction are stored, while regarding the portions above the threshold value Tkh as rules. The number Ny of horizontal rules obtained from the histogram in the horizontal direction are stored while regarding the portions above the threshold value Tkw as rules. When three or more vertical rules and three or more horizontal rules exist, the area is determined to be a table area (S1506, S1508, S1509 in FIG. 26). When the number of rules is less than three, the area is decided to be a modified separator area (S1506, S1508, S1507 in FIG. 26).
(step S1206)

Finally, the rectangle data of various kinds of areas obtained as mentioned above is generated from the output unit 104 together with the image data.

In the image input in step S201, by judging whether the input image is a multivalue image or not and by converting the input image into the binary image, the area dividing process can be performed even when the input image is a multivalue image such as a color image.

In the image input in step S201, when the number of pixels of the input image is so large that an extremely long processing time is necessary, the processing speed can also be raised by the image thinning process for thinning out the image of (m dots in the vertical direction)×(n dots in the horizontal direction), thereby newly forming one pixel.

In the detection or the like of a separator in step S203, by distinguishing the rectangle labels by a difference between the vertical and horizontal directions of the separator, a difference between the threshold values when obtaining a figure, a table, etc., the further detailed area attributes can also be classified.

In the table rule detection in step S1204, when it is known that the inclination of the image after it is input is small, by tracing the lines in place of calculating a histogram, the table rules can also be detected.

Figure 27:
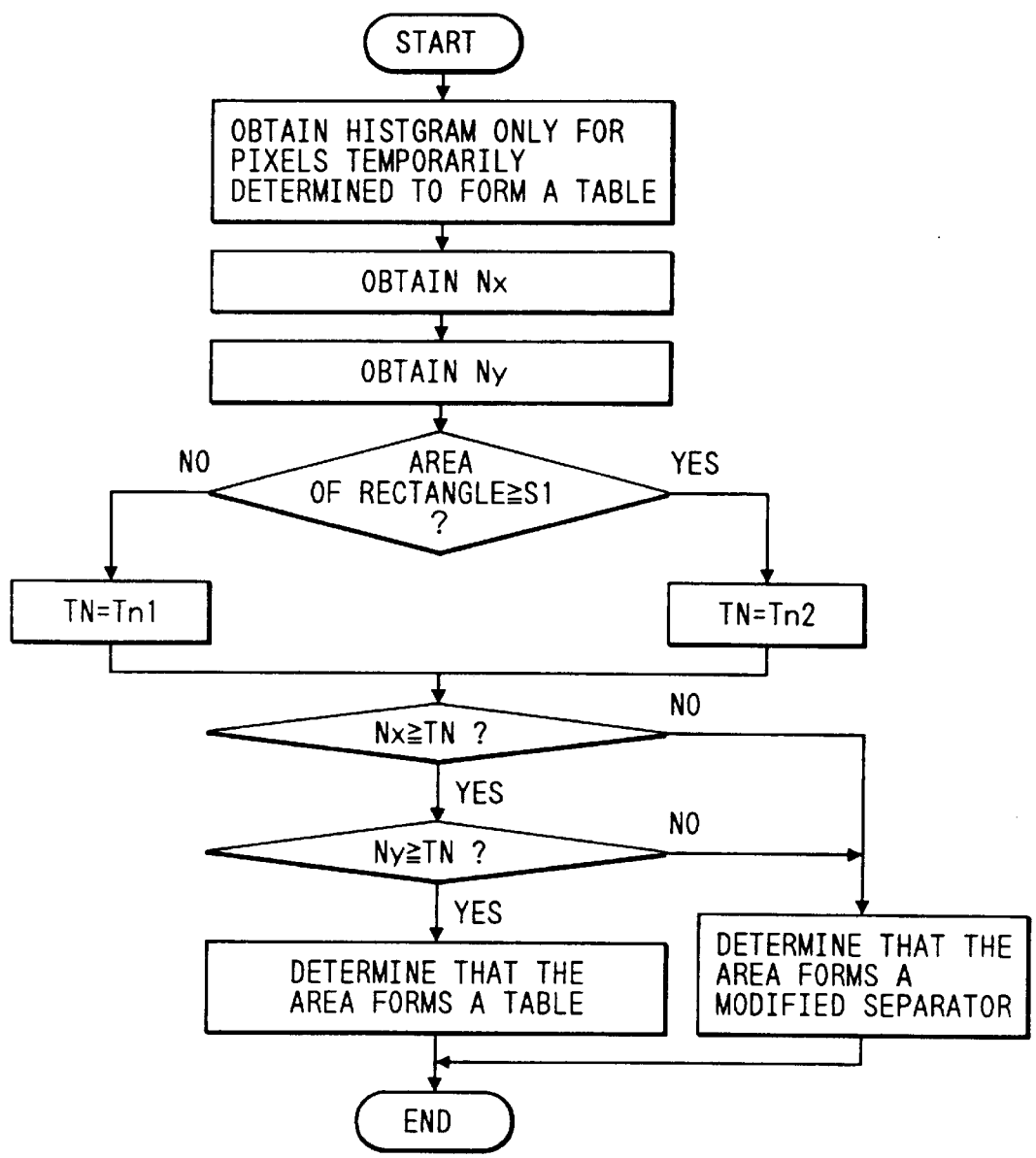
FIG. 27 is a flowchart showing an example of processes of the table area determiner of the embodiment 2.

In the table area determination in step S1205, in place of fixing the threshold value TN to decide whether the area is a table area or not, as shown in FIG. 27, the area of rectangle is compared with a threshold value S1 and the preset number of rules is compared with threshold values Tni (area≧S1) and Tn2 (area<S1). When the rules above the threshold values exist, the area is determined to be a table area. When the number of rules is less than the threshold values, the area is decided as a modified separator area. Due to this, they can be replaced.

Figure 28:
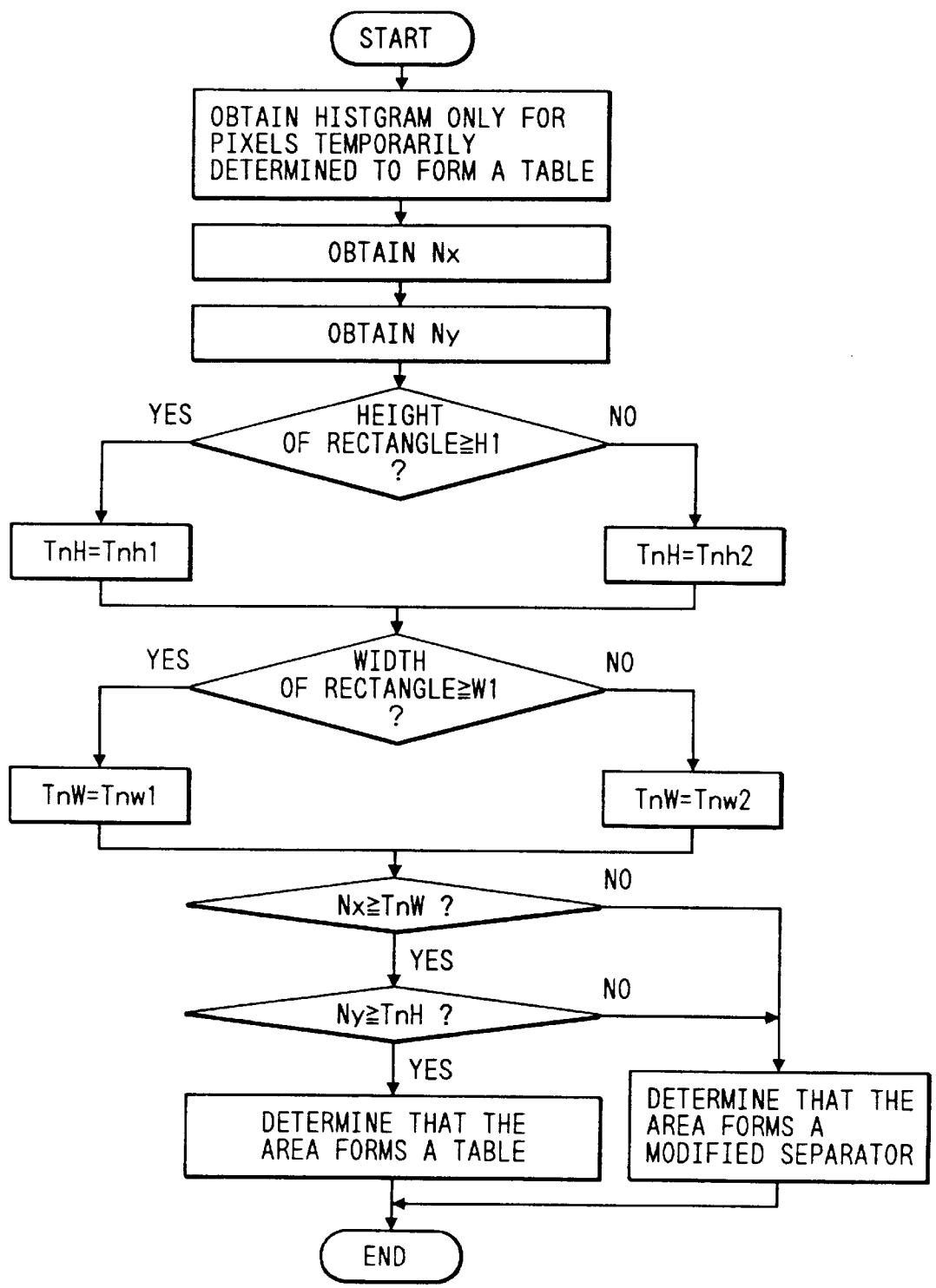
FIG. 28 is a flowchart showing an example of processes of the table area determiner of the embodiment 2.

Further, as shown in FIG. 28, the threshold values which were determined in correspondence to the magnitude of the area of the rectangle which was temporarily determined as a table area are decided on the basis of the width and height of the rectangle and are respectively set to W1 and H1. A threshold value of the number of vertical rules is set to TnH. A threshold value of the number horizontal rules is set to TnW. By such a method, they can also be replaced.

In the last output in step S1206, only the image data of the necessary area can also be generated with reference to the rectangle data of the various kinds of areas. The memory area and processing time can be further reduced.

The method of obtaining the histogram of the area whose attribute was determined to be a table area has been used as a method of determining the table area in the above description. Explanation will now be made with respect to an example in which the table area is determined by the ratio of the area in the table frame to the area of the area which was decided to be a table area.

The process in this example is as shown in the flowchart of FIG. 13 except that the process in step S204 differs from that in FIG. 13. Step S204, therefore, will now be described.
(step S204)

Figure 33:
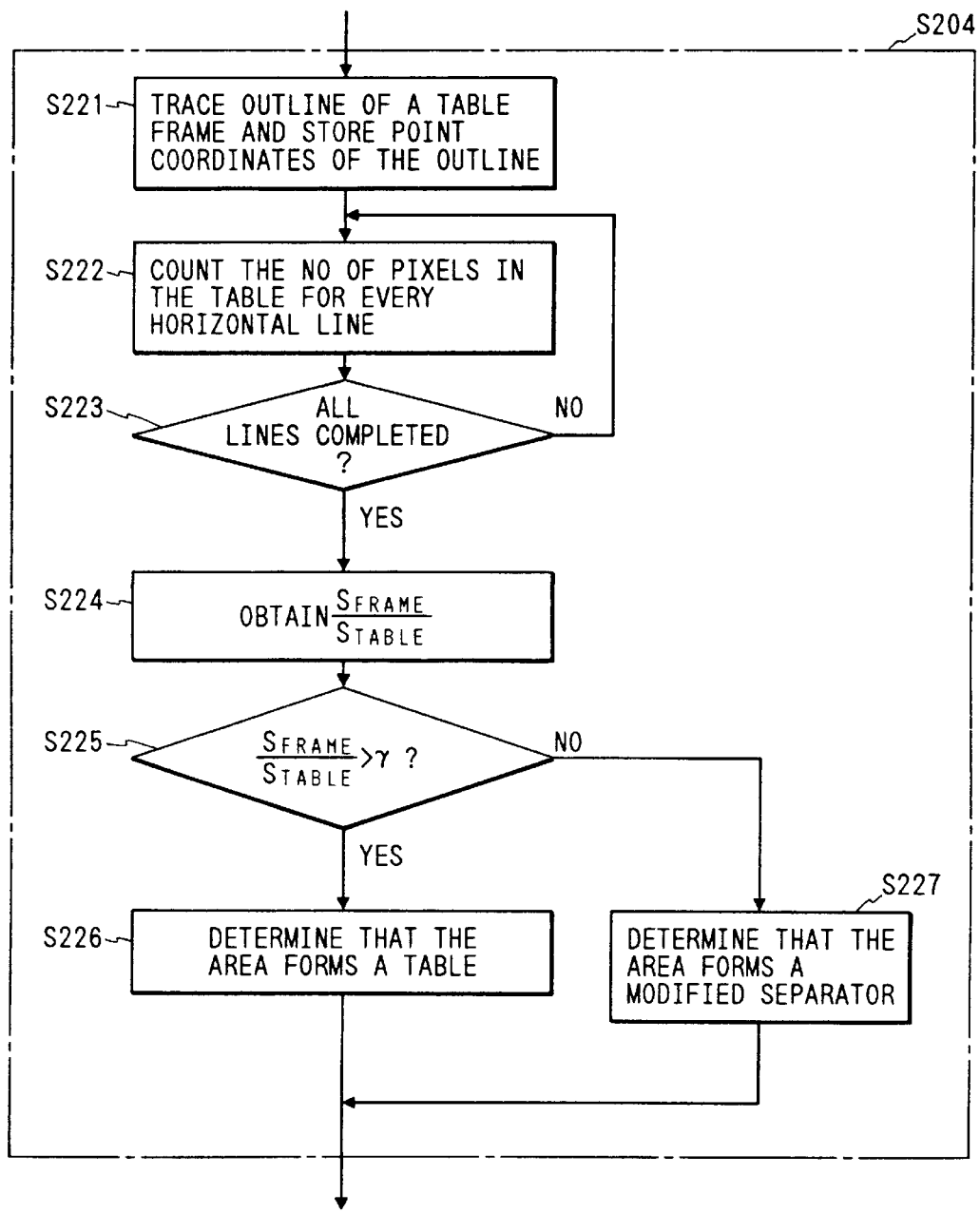
FIG. 33 is a flowchart showing an example of processes of a table area determiner of the embodiment 2.

Subsequently, in the table area determiner 208, a table area is determined. FIG. 33 is a flowchart for describing in detail the determining process of the table area in step S204. The determining process will now be described hereinbelow with reference to the flowchart of FIG. 33.

First, in step S221, an outline of an outer frame of a table is traced and point coordinates constructing the outline are stored.

Figure 34:
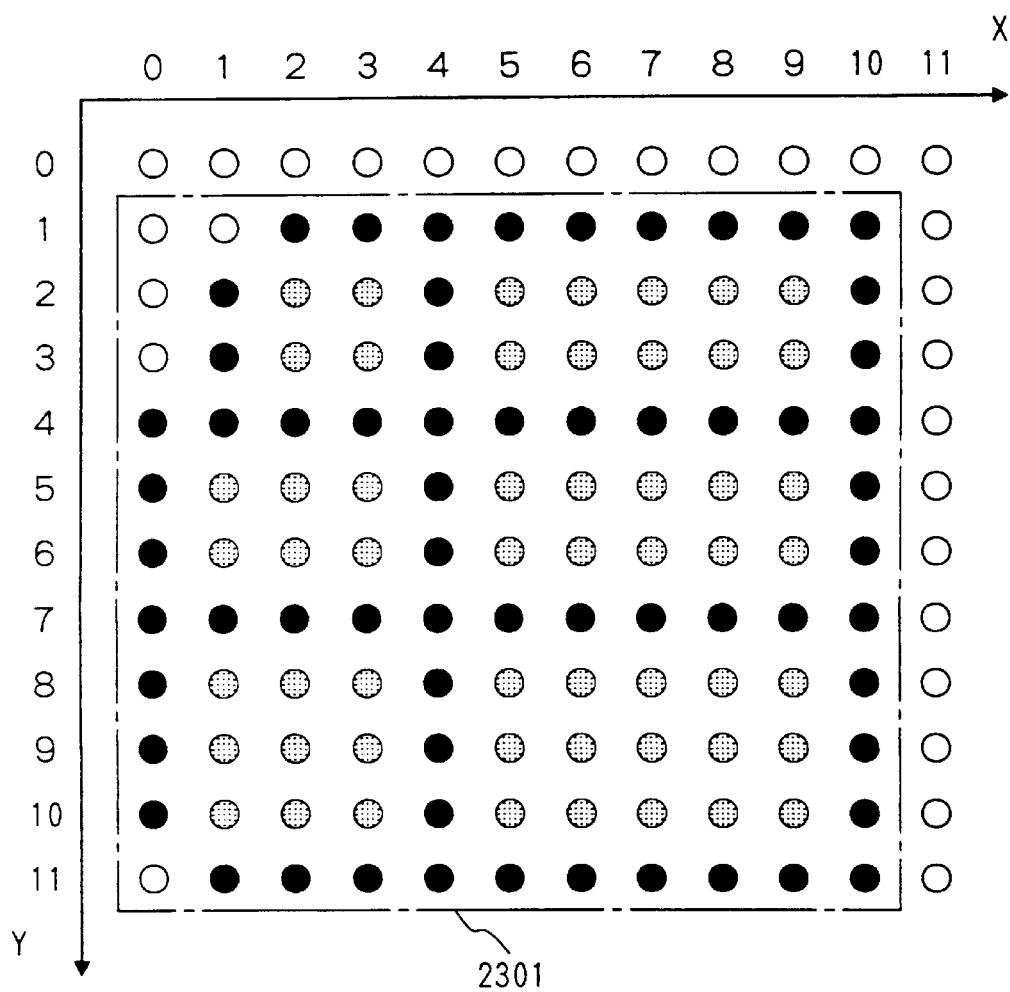
FIG. 34 is a diagram showing an area of a table and each pixel of the embodiment 2.

FIG. 34 is a diagram for describing the processes in steps S221 to S223.

In FIG. 34, reference numeral 2301 denotes a (very small) rectangle area which was determined to be a table; a white circle indicates a white pixel; a black dot denotes a black pixel; and a gray dot indicates a pixel which belongs to the inside of the table although it is a white pixel.

The black pixels for characters are omitted in the table.

First, the portion within the table area is observed for every line from the top and from the left side, thereby searching the black pixels constructing the table frame. When a black pixel is found out, its coordinates are stored into the memory 103. In the example of the area 2301, the table area is observed in the direction from the coordinates (0, 1) to the coordinates (10, 1) to see if a black pixel exists or not for every pixel. Since the black pixel exists at the position of the coordinates (2, 1), the coordinates are stored into the memory 103.

Subsequently, the outline is traced clockwise or counterclockwise from the black pixel and the coordinates of the black pixels (hereinafter, referred to as outline points) constructing the outline are stored into the memory 103. In the example of the area 2301, the coordinates up to (2, 1)–(10, 1), (10, 1)–(10, 11), (10, 11)–(1, 11), (0, 10)–(0, 4), and (1, 4)–(1, 2) are stored as outline points into the memory 103.

In step S222, the number of pixels which belong to the inside of the table is counted every horizontal line and added. In this case, two points at the rightmost edge and leftmost edge of the outline points stored in the memory 103 in step S221 are extracted for every line. The distance between the two extracted points is added as the number of pixels belonging to the inside of the table. This process can be shown by the following equation.

(x coordinate of the right edge)−(x coordinate of the left edge)+1= (the number of pixels in the table)

By the above method, even when the outline is complicated or the table frame lacks, the area in the table can be easily and rapidly obtained. Although such a process is sufficient as a determining process which is executed in the table area determiner 208, the area in the table can also be accurately obtained.

In the example of the area 2301 in FIG. 34, the line whose y coordinate is equal to 1 as the top horizontal line will now be considered. On the line of y=1, the coordinates of the outline point of the leftmost edge are set to (2, 1). The coordinates of the outline point of the rightmost edge are set to (10, 1). Therefore, the number of pixels in the table is

10−2+1=9

In step S223, a check is made to determine if the numbers of pixels have been counted with respect to all of the lines in the table area or not, If YES, step S224 follows. When a line in which the number of pixels is not yet counted still remains, the processing routine is returned to step S222 and the processes are continued.

In the example of the area 2301, since the counting operations regarding all of the lines are not yet finished, the processing routine is returned to step S222 and the processes are executed for the line of y=2. In the line of y=2, the coordinates of the outline point of the leftmost edge are set to (1, 2) and the coordinates of the outline point of the rightmost edge are set to (10, 2).

Therefore, the number of pixels in the table is

10−1+1=10

This number is added to the number (9) of pixels calculated with respect to the line of y=1, so that the total number of pixels is equal to 19.

Similarly, in the example of the area 2301, the above processes are executed up to the line of y=11. Thus, the number of pixels in the table is

9+10+10+11+11+11+11+11+11+11+10=116

In step S224, a ratio of the area $S_{frame}$ in the frame to the area $S_{table}$ of the rectangle area which was determined to be a table area is obtained.

In step S225, a check is made to see if the ratio of the area in the frame is larger than a threshold value or not. Namely, when the following relation is satisfied, (area $S_{frame}$ in the frame)÷(area $S_{table}$ of the rectangle area which was decided to be a table area)>(threshold value γ)

the relevant rectangle is determined to be a table area in step S226. The processing routine advances to step S205. When the above relation is not satisfied, in step S227, the relevant rectangle is determined to be a modified separator area and the rectangle label of the relevant rectangle stored in the memory 103 is changed to −3. After that, step S205 follows. The threshold value γ is set to γ=0.9 here.

In the example of the area 2301, (area in the frame)=9+10+10+11+11+11+11+11+11+11+10=116

(area of the rectangle area which was determined to be a table area)=11×11=121

Therefore, 116÷121=0.959>0.9 and the following relation is satisfied.

(area in the frame)÷(area of the rectangle area which was decided to be a table area)>(threshold value γ)

Therefore, the area 2301 is determined to be a table area and step S205 follows.

Figure 18:
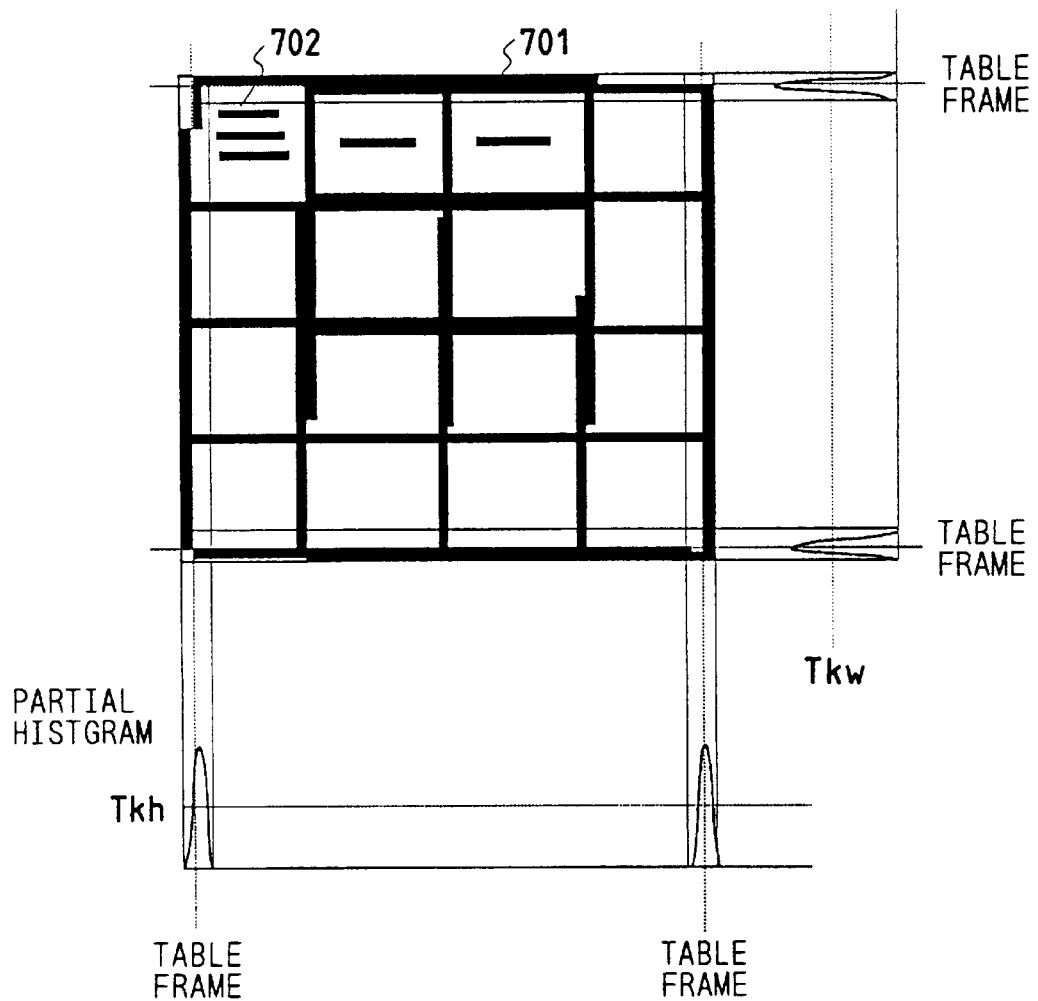
FIG. 18 is a diagram showing a histogram when an area is determined to be a table area of the embodiment 2.
Figure 19:
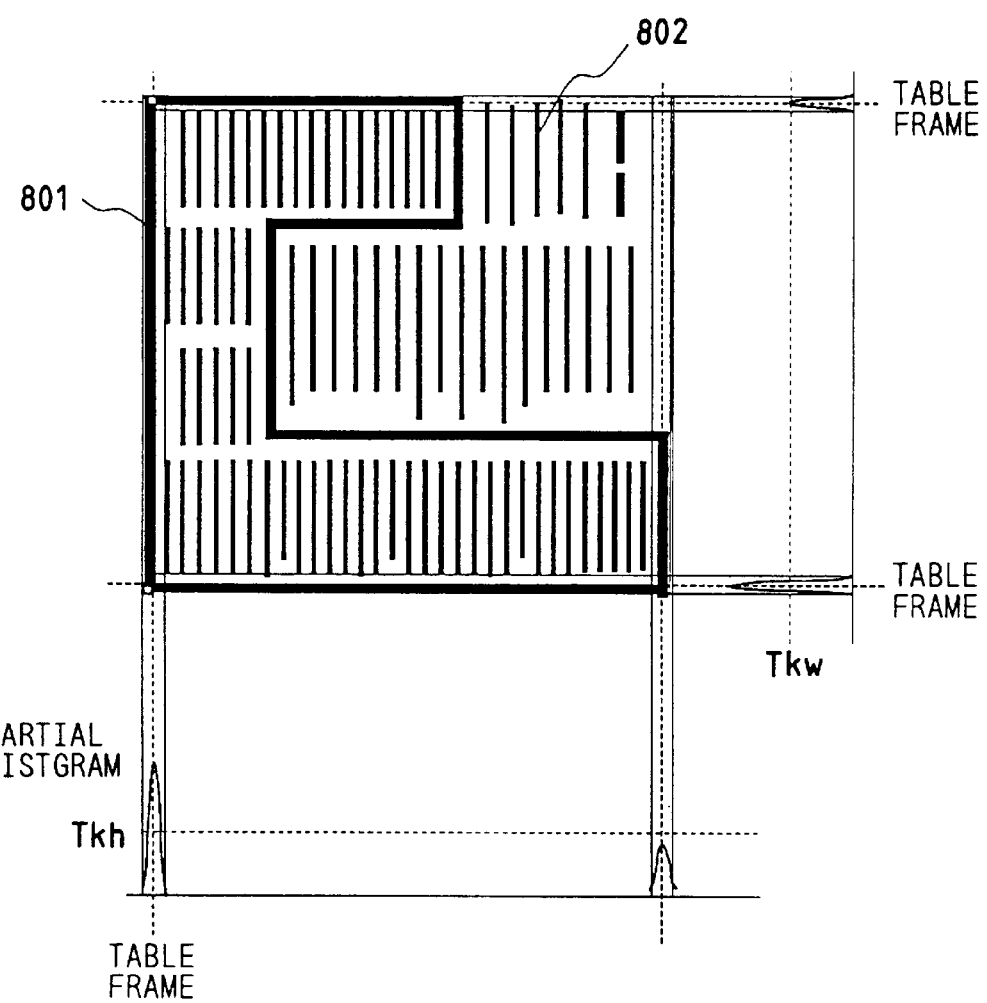
FIG. 19 is a diagram showing a histogram when an area is determined to be a modified separator area of the embodiment Z.

Similarly, in the example shown in FIG. 18, the inside of the table surrounded by a frame 702 is expressed like a black portion 801 in FIG. 19 and the ratio of the area in the frame is larger than the threshold value γ, so that such a portion is determined to be a table and step S205 follows.

Figure 29:
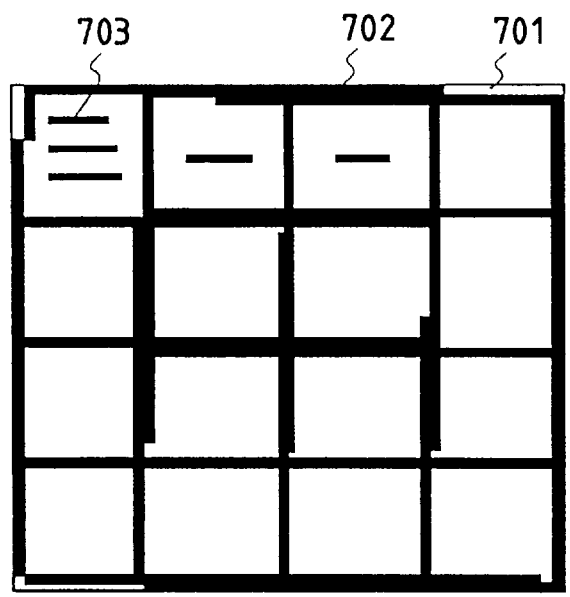
FIG. 29 is a diagram showing a table and rectangles showing areas of the table of the embodiment 2.
Figure 30:
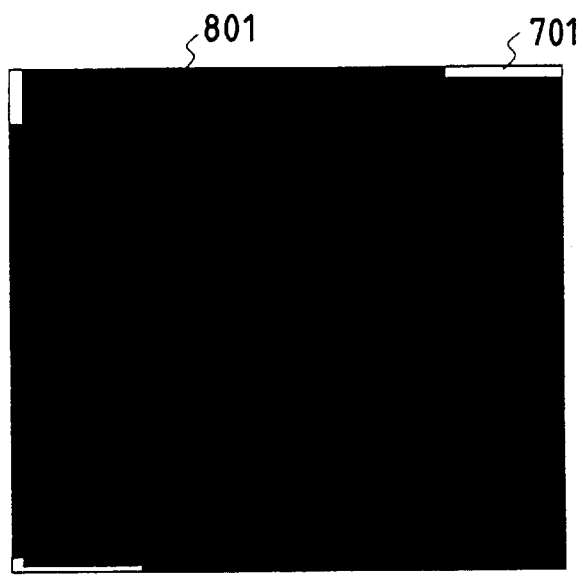
FIG. 30 is a diagram showing the inside of a table and rectangles showing areas of the table of the embodiment 2.

In FIG. 29, reference numeral 701 denotes the rectangle area which was determined to be a table; 702 the frame; and 703 a line of a horizontal writing sentence.

Figure 31:
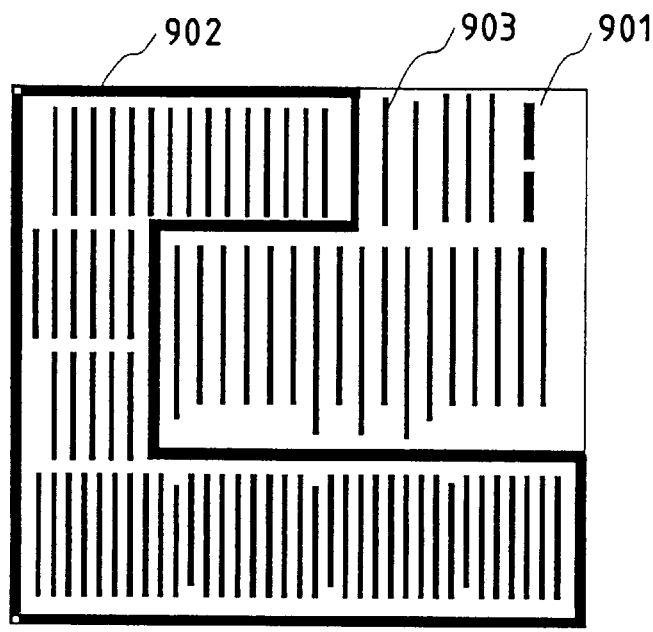
FIG. 31 is a diagram showing a modified separator and rectangles showing an area of the modified separator of the embodiment 2.
Figure 32:
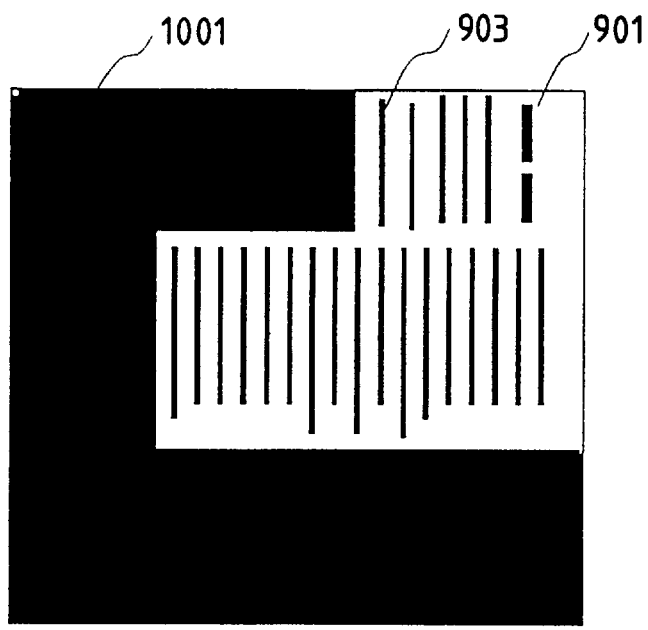
FIG. 32 is a diagram showing the inside of a modified separator and rectangles showing an area of the modified separator of the embodiment 2.

Similarly, in the example shown in FIG. 31, the inside of the table surrounded by a frame 902 is shown like a black portion 1001 in FIG. 32 and the ratio of the area in the table frame is smaller than the threshold value γ, so that such a portion is determined to be a modified separator.

In FIG. 31, reference numeral 901 denotes a rectangle area which was determined to be a table; 902 the frame; and 903 a line of a vertical writing sentence.

In the table area determination in step S204, although the number of pixels belonging to the inside of the table has been counted every horizontal line and added in step S222, it is also possible to count and add the number of pixels belonging to the inside of the table for every vertical line.

In the table area determination in step S204, although the number of pixels belonging to the inside of the table has been counted and added for every horizontal line in step S222, the table area determining process can be performed irrespective of the execution of the operation to count the number of black pixels constructing the sentence in the frame in this instance.

In the table area determination in step S204, the number of pixels belonging to the inside of the table has been counted and added every horizontal line in step S222 and the area in the frame has been calculated. However, the table area determining process can be executed even when the area in the frame is obtained by any other means.

In the last generation in step S205, only the image data of the necessary area can also be generated with reference to the rectangle data of various kinds of areas. The memory area and the processing time can further be reduced.

For example, a process to correct the areas which were divided and obtained by the method as mentioned above and the attributes of those areas will now be described.

Figure 35:
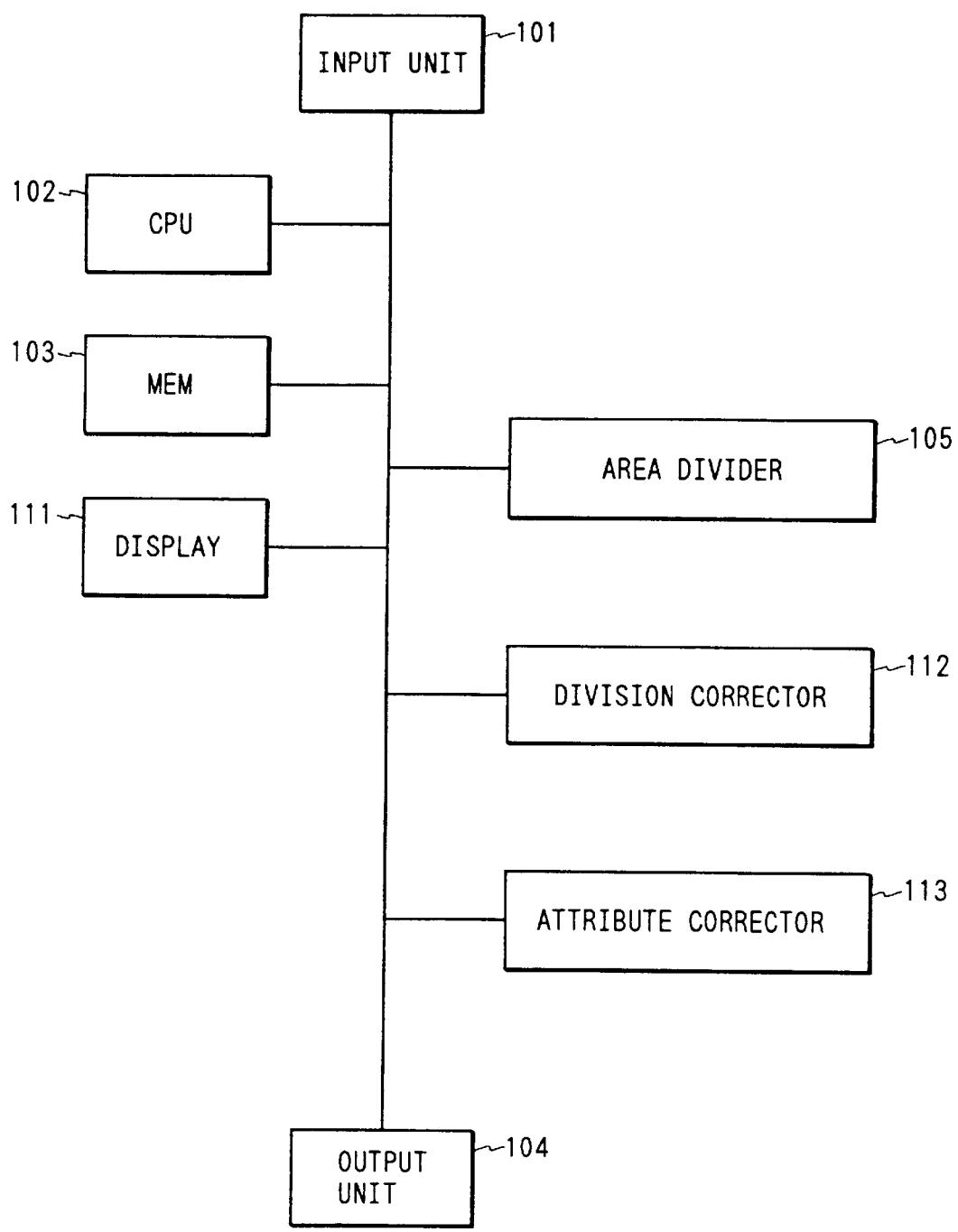
FIG. 35 is a block diagram showing a schematic construction of the image processing apparatus of the embodiment 2.

FIG. 35 is a block diagram showing a construction of the image processing apparatus of the embodiment.

In FIG. 35, constructions shown by reference numerals 101 to 105 are substantially the same as those shown in FIG. 12 and their descriptions are omitted here.

Reference numeral 117 denotes display unit for overlapping the results divided by the area divider 105 to the original image data, for displaying a frame, and for displaying a list of attributes.

Reference numeral 112 denotes an area division corrector to correct the erroneous division of the areas divided by the area divider 105.

Reference numeral 113 denotes an area attribute corrector to correct the area attribute which was presumed by the area divider 105.

Figure 36:
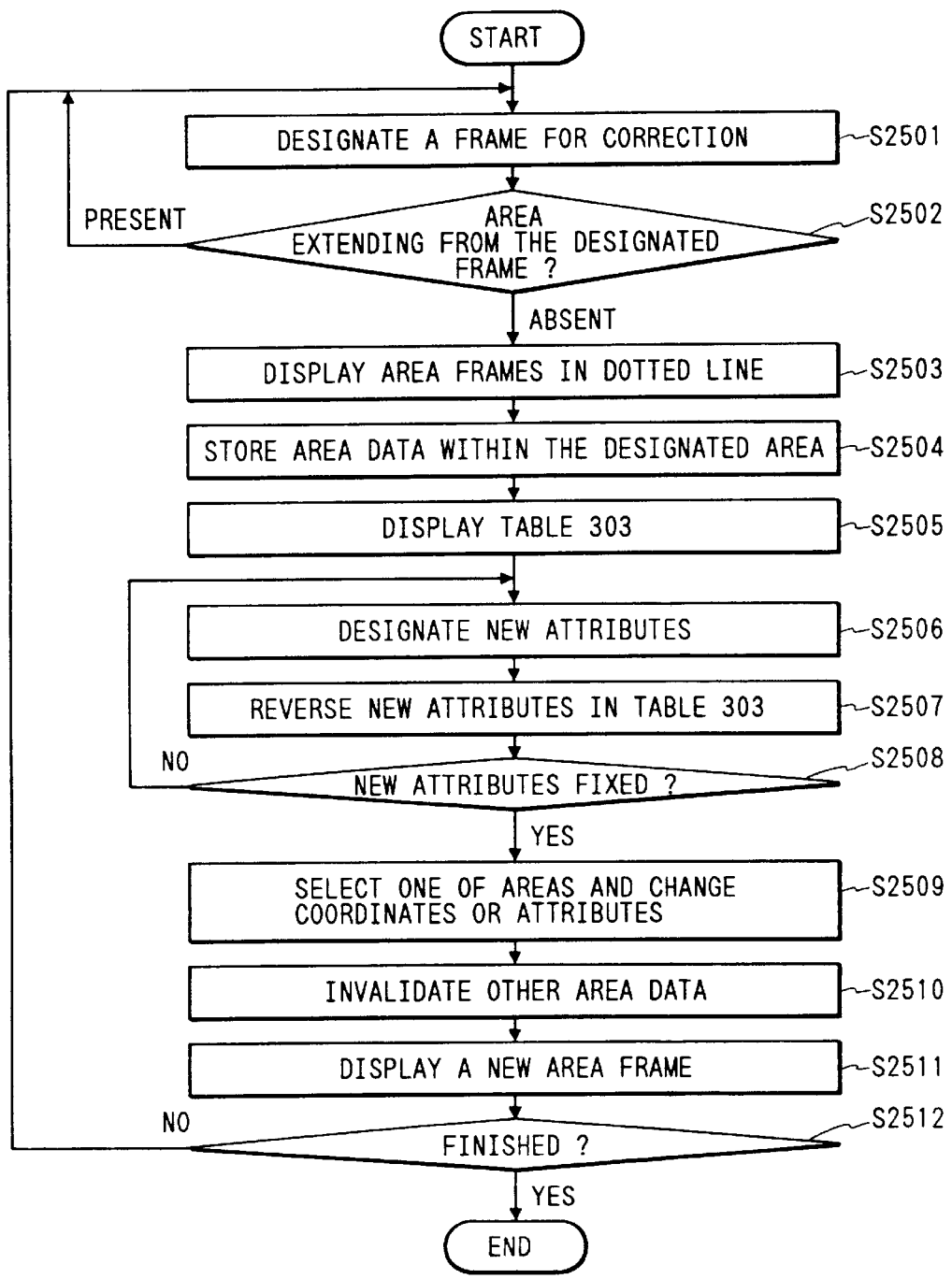
FIG. 36 is a flowchart showing an area division correcting process of the embodiment 2.

FIG. 36 is a flowchart showing an area division correcting process in the image processing apparatus of the embodiment. A control program to execute the area division correcting process is stored in the memory 103.

Figure 39:
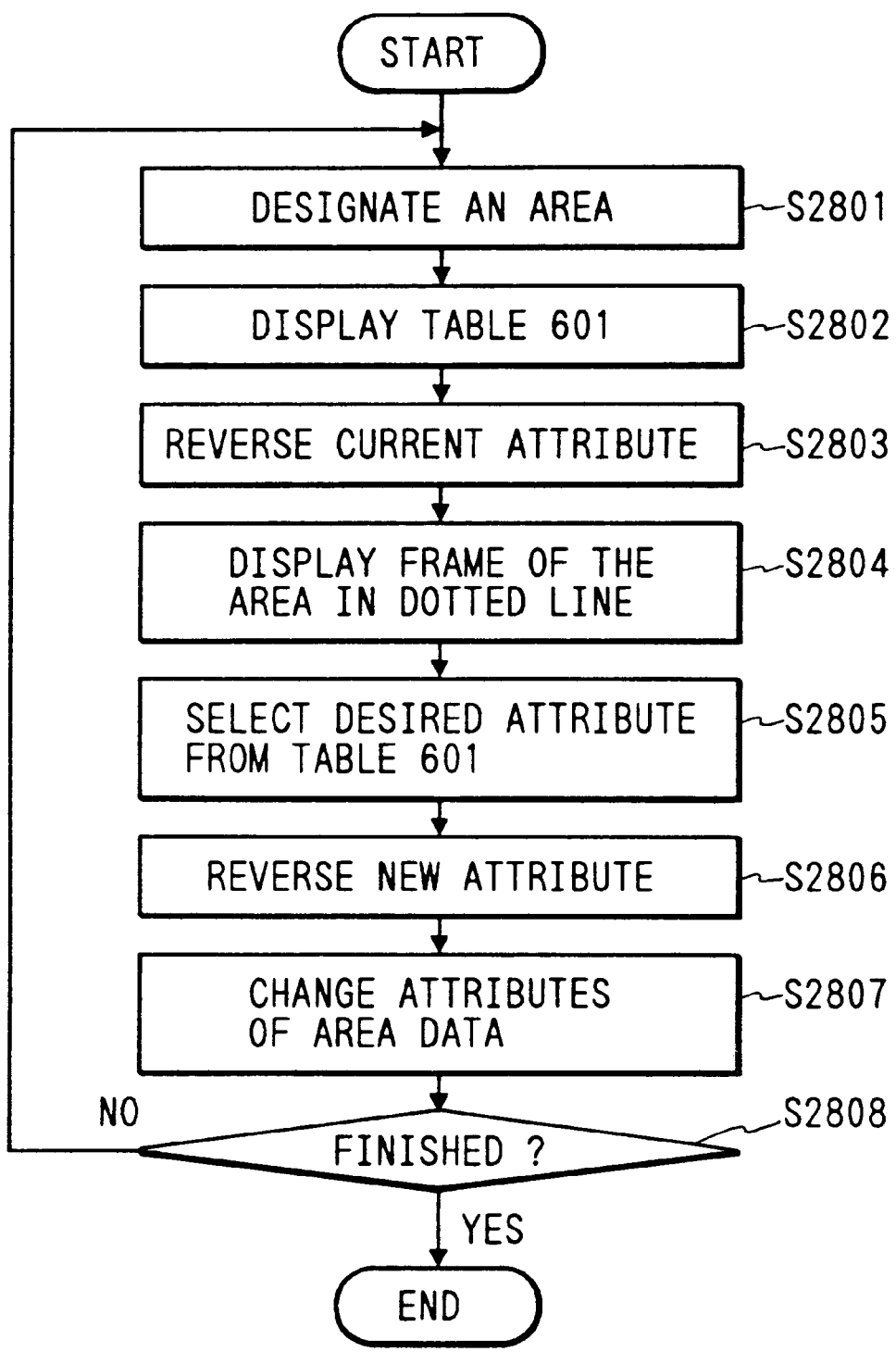
FIG. 39 is a flowchart showing an area attribute correcting process of the embodiment 2.
Figure 40:
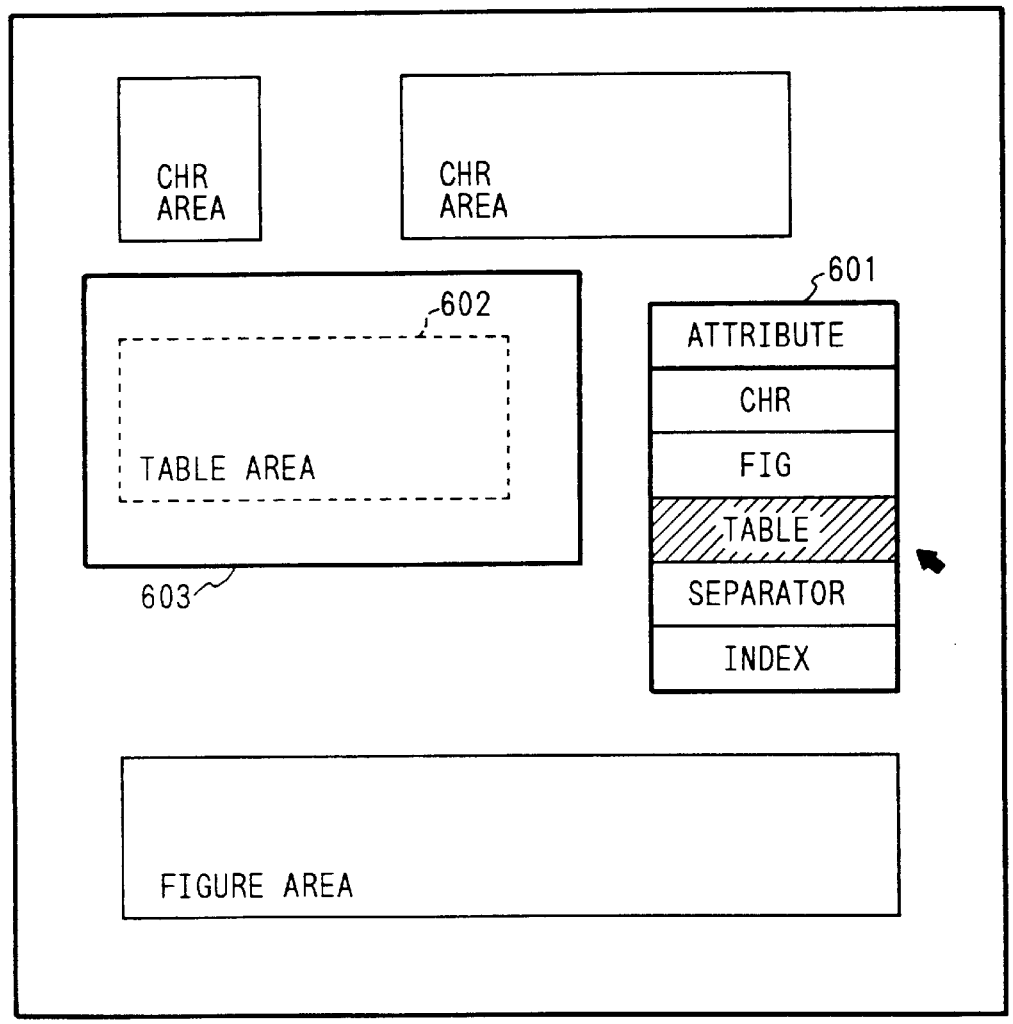
FIG. 40 is a diagram showing an example of an area attribute correcting process display unit of the embodiment 2.

FIG. 39 is a flowchart showing an area attribute correcting process in the image processing apparatus of the embodiment. A control program to execute this process is stored in the memory 103.

(1) The case where the area which should inherently be one area was erroneously divided into a plurality of areas:

In the division corrector 112, a plurality of areas which were erroneously divided by the area divider 105 are indicated by surrounding them by a frame (301 in FIG. 37) by using a pointing device or the like (S2501 in FIG. 36). In this instance, the corresponding area frames (areas A, B, and C in FIG. 37) are shown by changing a display line from the solid lines to the dotted lines (S2503 in FIG. 36).

When an area exceeding the designated frame exists, the designated frame is invalidated and erased and the processing routine is-returned to the first step (S2502 in FIG. 36).

When all of the areas exist within the designated frame, the area data (coordinates and attribute in FIG. 38) of all of the areas in the frame surrounded by the frame are preserved in the memory 103 (S2504 in FIG. 36). At the same time, a list table for setting new area attributes (303 in FIG. 37) is displayed (S2505 in FIG. 36).

By selecting the attributes of the new area from the list table (S2506 in FIG. 36), the new attributes are reversed and displayed (S2507 in FIG. 36). When the new attributes are determined (S2508 in FIG. 36), either one of a plurality of areas existing in the designated frame is unconditionally selected and the coordinates, attributes and the area data are changed (S2509 in FIG. 36). The other remaining area data is invalidated (S2510 in FIG. 36). A new area frame (302 in FIG. 37) is displayed (S2511 in FIG. 36).

A plurality of areas are combined to one area by the above operation.

In the case where the attributes of the area are wrong:

In the attribute corrector 113, in the case where the operator wants to change only the attributes of the area data which was presumed by the area divider 105, only a target area (602 in FIG. 40) is designated by surrounding by a frame (603 in FIG. 40) by using a pointing device or the like (S2801 in FIG. 39) and a list table (601 in FIG. 40) of the attributes is displayed (S2802 in FIG. 39). In this instance, the current attributes are reversed and displayed (S2803 in FIG. 39) and the relevant area frame is changed from the solid line to the dotted line (602 in FIG. 40) (S2804 in FIG. 39).

By selecting the attributes to be changed from the list table (S2805 in FIG. 39), the reversed display of the original attributes is erased and the new attributes are reversed and displayed (S2806 in FIG. 39) and the attributes of the area data are also simultaneously changed (S2807 in FIG. 39).

In the division corrector 112, in place of designating the area by using the pointing device or the like, the area can be also designated by vertically or horizontally moving a cursor, or by using a key on a keyboard.

In place of showing a fact that a plurality of areas were selected by the designated frames by displaying using the dotted lines, such a fact can also be shown by changing the display color of the area frame.

Figures 37, 38:
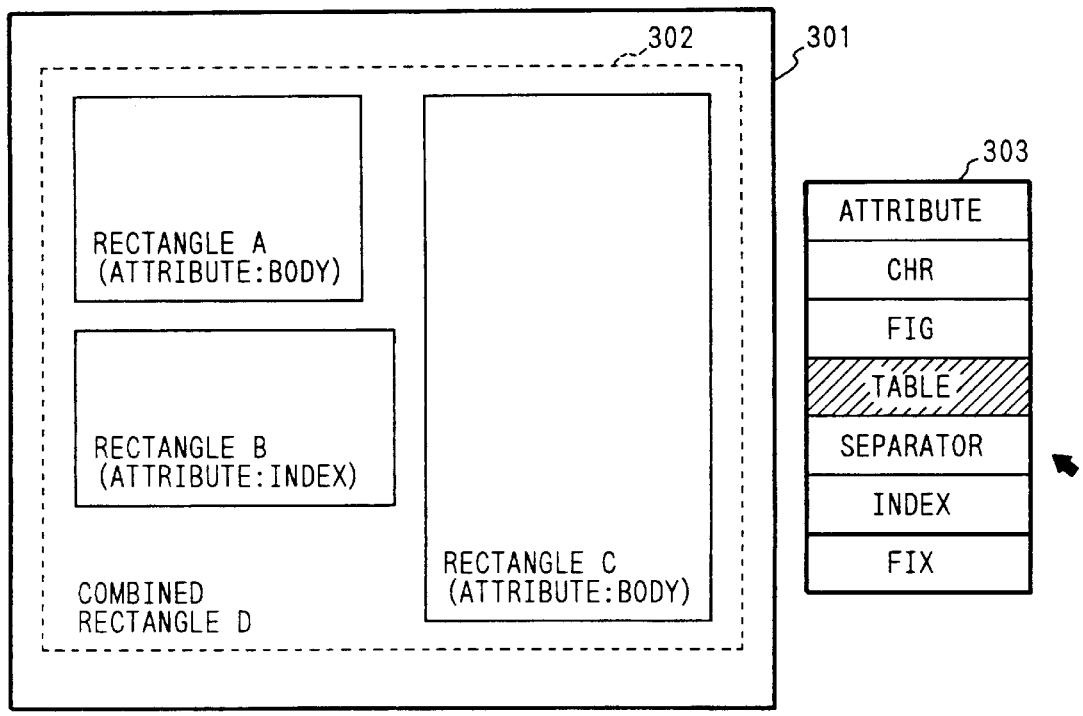
FIG. 37 is a diagram showing an example of the area division correcting process of the embodiment 2.
FIG. 38 is a diagram showing an area data structure of the embodiment 2.

The area data structure can include not only the data shown in the example of FIG. 38 but also data such as the number of pixels in the area of the writing direction of the sentence.

It is also possible to first execute only the combining process of the areas and to independently perform the attribute detecting process of the area later.

In the attribute corrector 113, in place of displaying the current attributes in the attribute list table by the reversing display, they can also be shown by changing the display color.

In place of displaying the relevant area frame by changing from the solid line to the dotted line, it can also be shown by changing the frame color.

In place of displaying the list table of attributes, by displaying only the current attributes and by changing the attribute display portion by instructing using the pointing device or the like or by providing a display change switch, and by repeating such a changing process until desired attributes are displayed, the attributes can also be changed.

Embodiment 3

A preferred third embodiment of the invention will now be described with reference to FIGS. 41 to 46.

Figure 41:
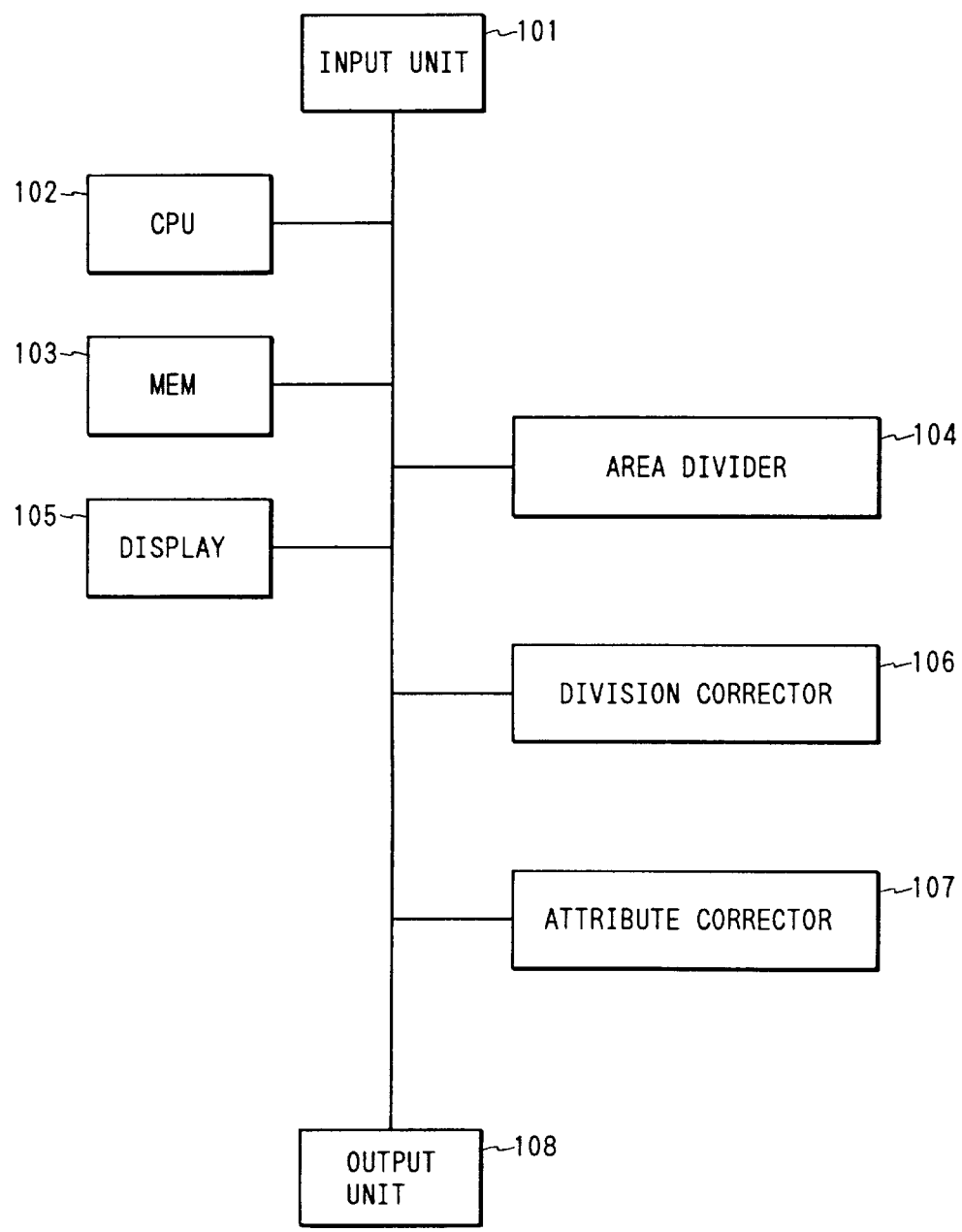
FIG. 41 is a block diagram showing a schematic construction of an image processing apparatus according to an embodiment 3.

FIG. 41 is a block diagram showing an image processing apparatus according to the third embodiment of the invention.

In the diagram, reference numeral 101 denotes an input unit for inputting image data. Reference numeral 102 denotes a central processing unit (CPU) to control the apparatus in accordance with control programs stored in a memory 103 and to execute processing arithmetic operations in each section.

Reference numeral 103 denotes a memory to store control programs and various kinds of data, which will be described hereinlater, are stored.

Reference numeral 105 denotes an area divider to divide an area and to assign the attributes of the area.

Reference numeral 117 denotes a display unit for overlapping the results divided by the area divider 105 to the original data and displaying frames, thereby displaying a list table of the attributes.

Reference numeral 112 denotes the division collector to correct the erroneous division of the areas divided by the area divider 105.

Reference numeral 113 denotes the attribute corrector to correct the area attributes which were assigned by the area divider 105.

Reference numeral 104 denotes an output unit to generate the results of the arithmetic operations, the results of the image processes, and image data.

Figure 42:
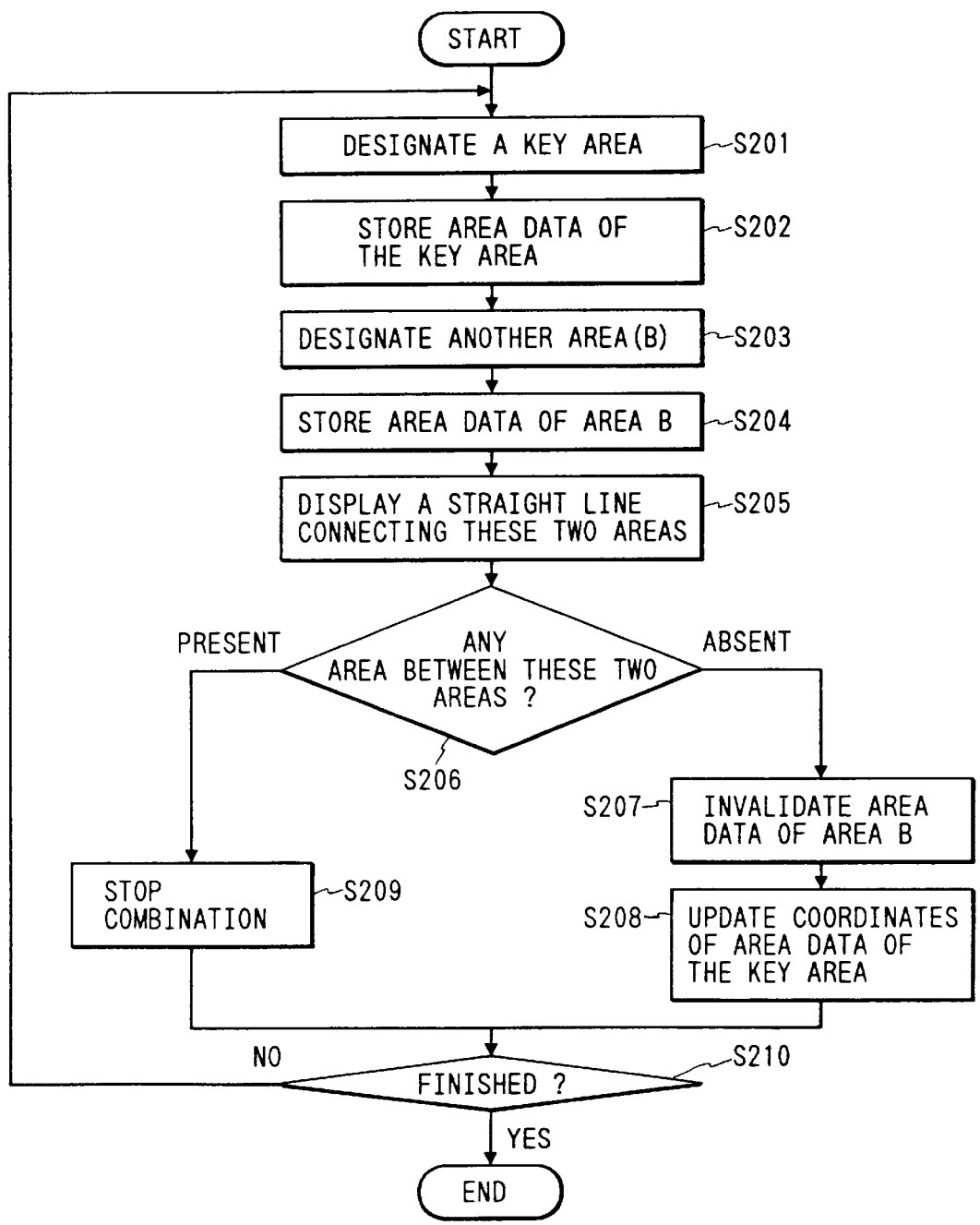
FIG. 42 is a flowchart showing an area division correcting process of the embodiment 3.
Figure 43:
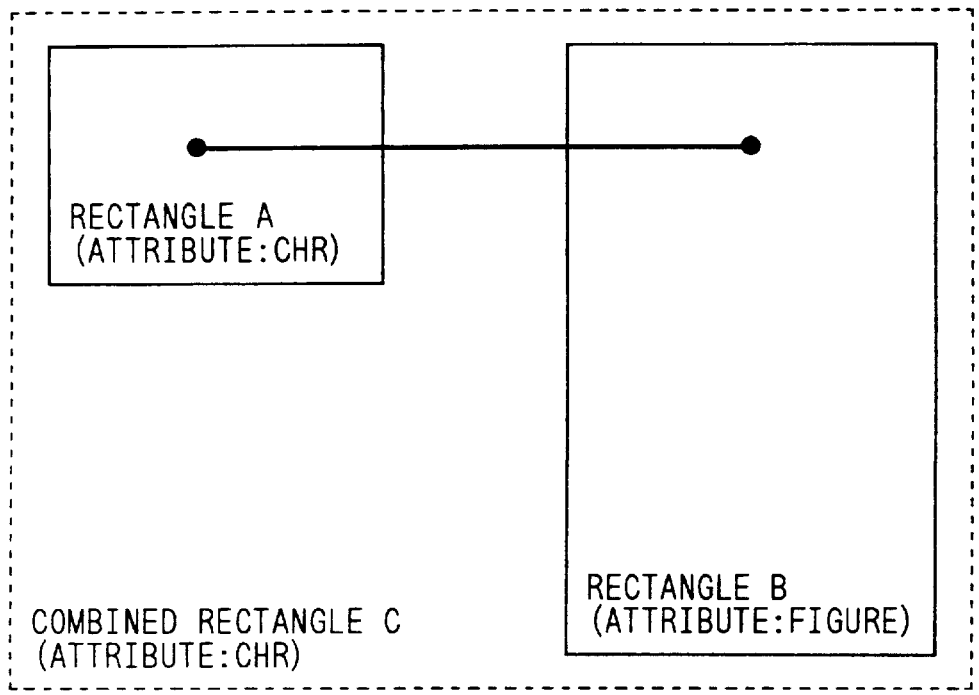
FIG. 43 is a diagram showing an example of the area division correcting process of the embodiment 3.

FIG. 42 is a flowchart showing the area division correcting process in the image processing apparatus of the embodiment. The control programs to execute the above processes are stored in the memory 103.

Figure 45:
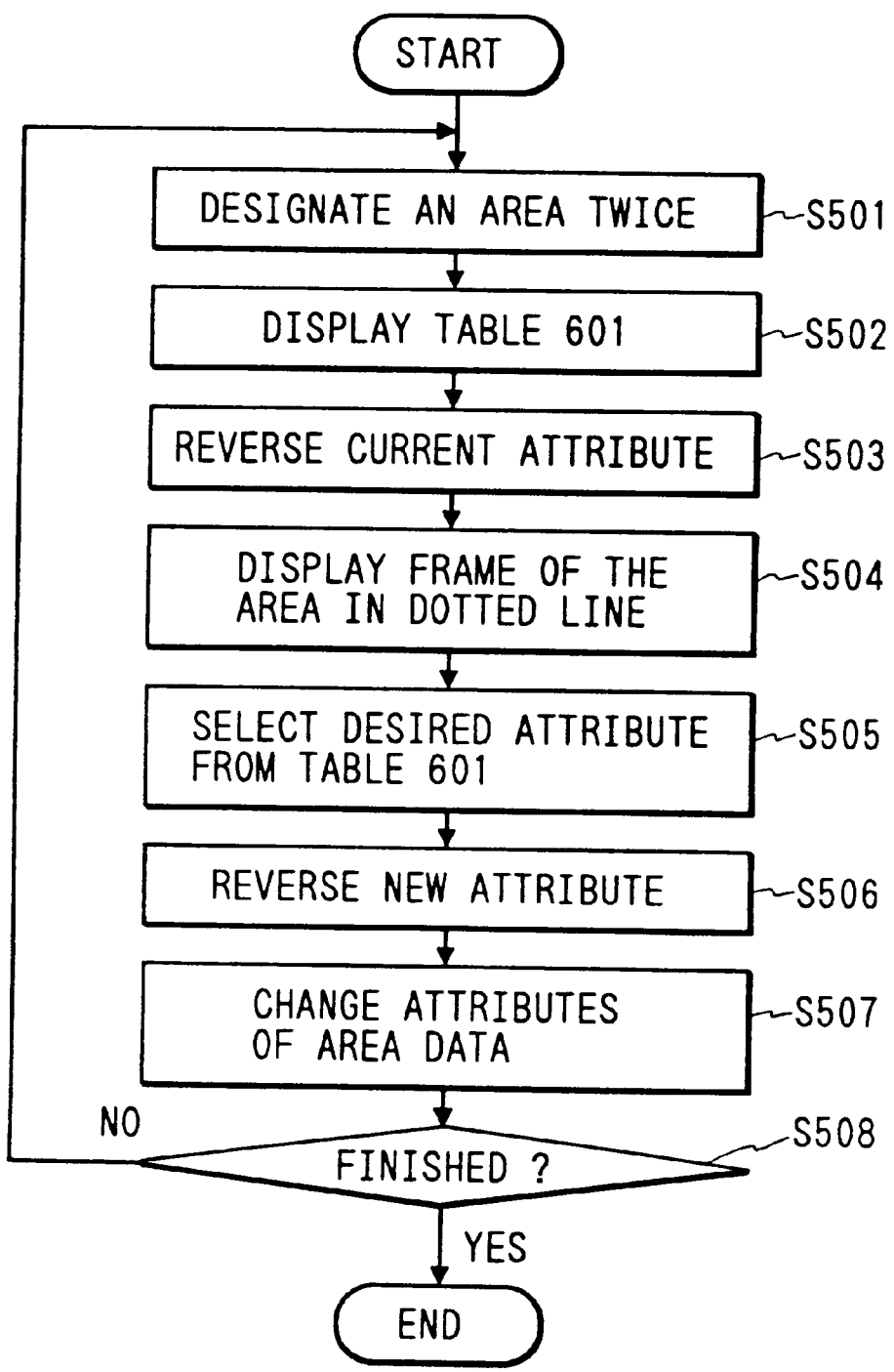
FIG. 45 is a flowchart showing an area attribute correcting process of the embodiment 3.
Figure 46:
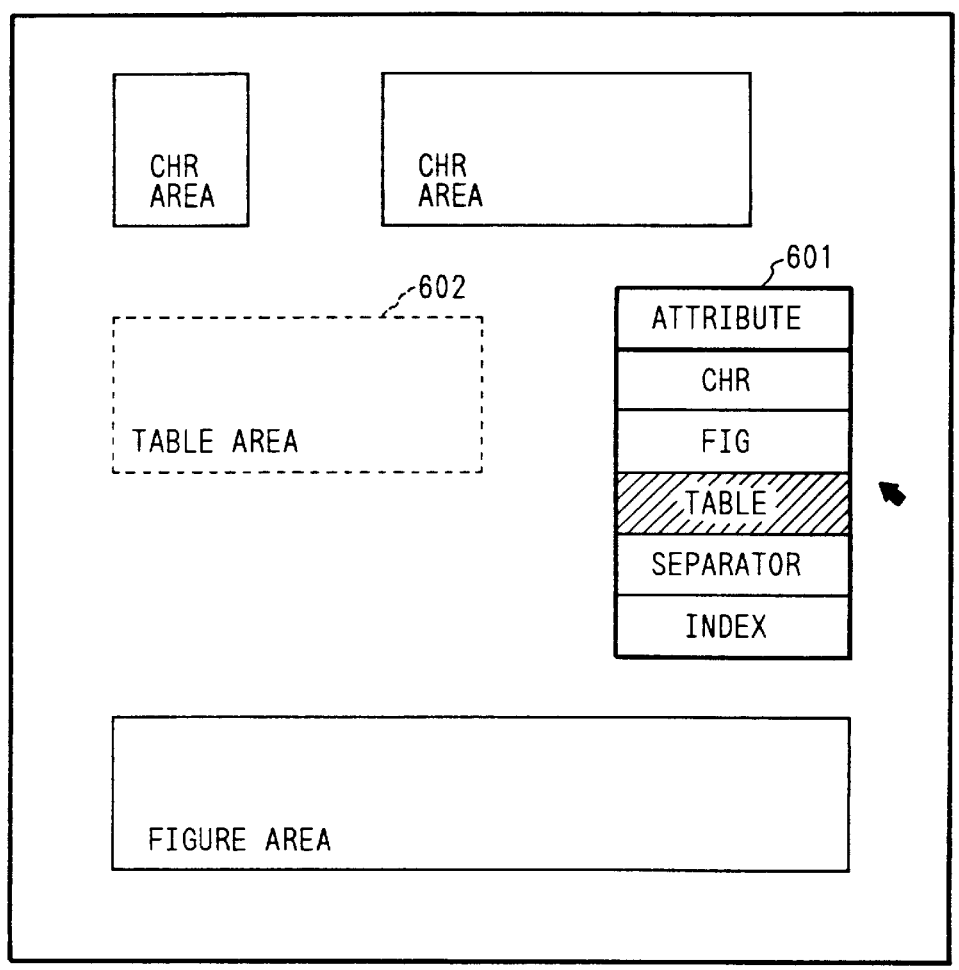
FIG. 46 is a diagram showing an example of a display unit of the area attribute correcting process of the embodiment 3.

FIG. 45 is a flowchart showing an area attribute correcting process in the image processing apparatus of the embodiment. The control program to execute this process is stored in the memory 103.

The correcting process in the case where an area which should inherently be one area, but was erroneously divided into a plurality of areas, will now be described with reference to FIG. 42.

In the division corrector 112, one of a plurality of areas which were erroneously divided by the area divider 105 is designated and selected as a key area by a pointing device or the like (S201 in FIG. 42). The area data (coordinates, attributes, etc.: refer to FIG. 44) of the key area (refer to an area A in FIG. 43) is preserved in the memory 103 (S202 in FIG. 42).

Another divided area (refer to an area B in FIG. 43) is designated by the pointing device or the like (S203 in FIG. 42). The area data (coordinates, attributes, etc.) of such an area are stored in the memory 103 (S204 in FIG. 42).

In this instance, a fact that those two areas were selected is shown by displaying a line segment (refer to a line segment in FIG. 43) connecting the designated points in both areas (S205 in FIG. 42). A check is made to see if another area exists between the two areas or not (S206 in FIG. 42). If NO, those two areas are combined and the area data of the area B is invalidated (S207 in FIG. 42). The coordinates of the area data of the key area are updated (however, the attributes are not changed) (S208 in FIG. 42). Consequently, the attributes of a new area (refer to an area C in FIG. 43) obtained by combining the two areas are the same as the attributes of the key area.

In the case where another area exists between the two areas, the combining process is stopped (S209 in FIG. 42).

By repeating the above operation, a plurality of areas can be combined into one area.

The correcting process in the case where the attributes of an area are wrong will now be described with reference to FIG. 45.

In the attribute corrector 113, in the case where the operator wants to change only the attributes of the area data which was assigned by the area divider 105, a target area (refer to 602 in FIG. 46) is continuously designated twice by the pointing device or the like (S501 in FIG. 45) and the list table of the attributes (refer to 601 in FIG. 46) is displayed (S502 in FIG. 45). In this instance, the current attributes are reversed and displayed (S503 in FIG. 45) and the relevant area frame is displayed by changing from the solid line to the dotted line (refer to 602 in FIG. 46) (S504 in FIG. 45).

By subsequently selecting the attributes which the operator wants to change from the list table (S505 in FIG. 45), the reversed display of the original attributes is erased and the new attributes are reversed and displayed (S506 in FIG. 45) and the attributes of the area data are also simultaneously updated (S507 in FIG. 45).

In the division corrector 112, in place of designating the area by the pointing device or the like, the area can be also designated by vertically or horizontally moving a cursor by a key on a keyboard.

On the other hand, the fact that two areas were selected has been indicated by displaying the line segment connecting the designated points in both areas. In place of such a method, however, the area frames of two areas can also be displayed by changing the display color.

Figure 44:
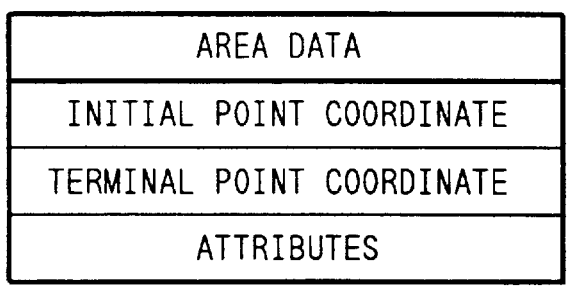
FIG. 44 is a diagram showing an area data structure of the embodiment 3.

Further, the area data structure can include not only the data shown as an example in FIG. 44 but also the data such as the number of pixels in the area and writing direction of the sentence.

In the attribute corrector 113, in place of continuously designating the area twice by using the pointing device or the like, it is also possible to construct in a manner such that an attribute changing mode switch is provided and is turned on or off, thereby changing the meaning of the instruction of the pointing device or the like (specifically speaking, the ON-state of the attribute changing mode switch indicates the area instruction to change the attributes of the area, and the OFF-state indicates the area instruction to correct the division of the area).

With respect to the display of the current attributes in the list table of the attributes, they can also be displayed by changing the display color in place of reversing and displaying.

Further, in place of displaying the relevant area frame by changing from the solid line to the dotted line, it can also be displayed by changing the frame color.

In place of the list table of the attributes, it is also possible to construct in a manner such that only the current attributes are displayed and the display of the attribute display portion is changed by an instruction by using the pointing device or the like or by providing and operating a display changing switch, and by repeating such an operation until desired attributes are displayed. Thus, attributes can easily be changed.

What is claimed is:

1. An image processing method comprising the steps of:

inputting image information;

dividing the input image information into a plurality of areas having respective kinds from among a plurality of different kinds, wherein each kind is distinct from the image information of the respective area;

displaying area images representing the plurality of divided areas together with the input image information;

selecting a desired one of the plurality of displayed area images;

displaying a kind list showing the plurality of kinds so that the kind for the selected area image is distinguishable in the kind list;

designating a kind from among the plurality of kinds shown in the displayed kind list; and correcting the kind for the selected area image to the designated kind.

2. A method according to claim 1, wherein the kinds represent any one of a character, a figure and a table.

3. An image processing apparatus comprising:

input means for inputting image information;

means for dividing the input image information into a plurality of areas having respective kinds from among a plurality of different kinds, wherein each kind is distinct from the image information of the respective area;

means for displaying area images representing the plurality of divided areas together with the input image information;

means for selecting a desired one of the plurality of displayed area images;

means for displaying a kind list showing the plurality of kinds so that the kind for the selected area image is distinguishable in the kind list;

means for designating a kind from among the plurality of kinds shown in the displayed kind list; and means for correcting the kind for the selected area image to the designated kind.

4. An apparatus according to claim 3, wherein the kinds represents any one of a character, a figure and a table.

5. An image processing apparatus comprising:

input means for inputting image information;

dividing means for determining characteristics of the input image information and dividing the input image information into a plurality of areas having respective kinds from among a plurality of different kinds, wherein each kind is distinct from the image information of the respective area;

memory means for storing, for each of the areas, coordinate data of the area and information on the respective kind of the area;

displaying means for displaying on a display area images representing the areas stored in the memory means;

area designating means for designating specific area images on the display to be united with each other from the plurality of divided areas included in an input image; and correcting means for generating a new area which includes the designated areas based on the coordinate data of the designated area images, and correcting the stored information in response to the generated new area.

6. An apparatus according to claim 5, further having means for correcting kinds of the designated area images in association with the division of said areas.

7. An apparatus according to claim 5, wherein the kinds represent any one of a character, a figure and a table.

8. An apparatus according to claim 5, further comprising means for displaying the stored information.

9. An apparatus according to claim 5, wherein said area designating means designates the area images on a display screen.

10. An apparatus according to claim 5, further comprising means for displaying the corrected information.

11. An image processing method comprising the steps of:

inputting image information;

determining characteristics of the input image information and dividing that information into a plurality of areas having respective kinds from among a plurality of different kinds, wherein each kind is distinct from the image information of the respective area;

storing, for each of the areas, coordinate data of the area and information on the respective kind of the area;

displaying area on a display images representing the areas stored in said storing step;

designating specific area images on the display to be united with each other from the plurality of divided areas included in an input image; and generating a new area which includes the designated areas based on the coordinate data of the designated area images, and correcting the stored information in response to the generated new area.

12. A method according to claim 11, wherein the kinds represent any one of a character, a figure and a table.

13. A method according to claim 11, further comprising a step of displaying the stored information.

14. A method according to claim 11, wherein said designating specific area images step designates the area images on a display screen.

15. A method according to claim 11, further comprising a step of displaying the corrected information.

16. A memory medium storing program codes for causing a programable apparatus to perform an image processing method comprising the steps of:

inputting image information;

dividing the input image information into a plurality of areas having respective kinds from among a plurality of different kinds, wherein each kind is distinct from the image information of the respective area;

displaying area images representing the plurality of divided areas together with the input image information;

selecting a desired one of the plurality of displayed area images;

displaying a kind list showing the plurality of kinds so that the kind for the selected area image is distinguishable in the kind list;

designating a kind from among the plurality of kinds shown in the displayed kind list; and correcting the kind for the selected area image to the designated kind.

17. A memory medium according to claim 16, wherein the kinds represent any one of a character, a figure and a table.

18. A memory medium according to claim 16, wherein said method further comprises the step of displaying the stored information.

19. A memory medium storing program codes for causing a programmable apparatus to perform an image processing method comprising the steps of:

inputting image information;

determining characteristics of the input image information and dividing that information into a plurality of areas having respective kinds from among a plurality of different kinds, wherein each kind is distinct from the image information of the respective area;

storing, for each of the areas, coordinate data of the area and information on the respective kind of the area;

displaying on a display area images representing the areas stored in said storing step;

designating specific area images on the display to be united with each other from the plurality of divided areas included in an input image; and generating a new area which includes the designated areas based on the coordinate data of the designated area images, and correcting the stored information in response to the generated new area.

20. A memory medium according to claim 19, wherein the kinds represent any one of a character, a figure and a table.

21. A memory medium according to claim 19, wherein said method further comprises a step of displaying the stored information.

\* \* \* \* \*

UNITED STATES PATENT AND TRADEMARK OFFICE
CERTIFICATE OF CORRECTION

PATENT NO.    : 6,104,832
DATED         : August 15, 2000
INVENTOR(S)   : KAZUYUKI SAITO ET AL.

It is certified that error appears in the above-identified patent and that said Letters Patent is hereby corrected as shown below:

ON THE TITLE PAGE [56] References Cited:

FOREIGN PATENT DOCUMENTS, "1015889 1/1998" should read --1-15889 1/1989--, "89-015889 1/1989 Japan G06K 9/20" should be deleted, and "3214967 9/1991" should read --3-214967 9/1991--.

SHEET 8:

FIG. 8, "HISTGRAM" should read --HISTOGRAM--.

SHEET 17:

FIG. 18, "HISTGRAM" should read --HISTOGRAM--.

SHEET 18:

FIG. 19, "HISTGRAM" should read --HISTOGRAM--.

SHEET 19:

FIG. 20, "HISTGRAM" (all occurrences) should read --HISTOGRAM--.

SHEET 20:

FIG. 21, "HISTGRAM" should read --HISTOGRAM--.

SHEET 21:

FIG. 22, "HISTGRAM" should read --HISTOGRAM--.

UNITED STATES PATENT AND TRADEMARK OFFICE
CERTIFICATE OF CORRECTION

PATENT NO. : 6,104,832
DATED : August 15, 2000
INVENTOR(S) : KAZUYUKI SAITO ET AL.

Figure 24:
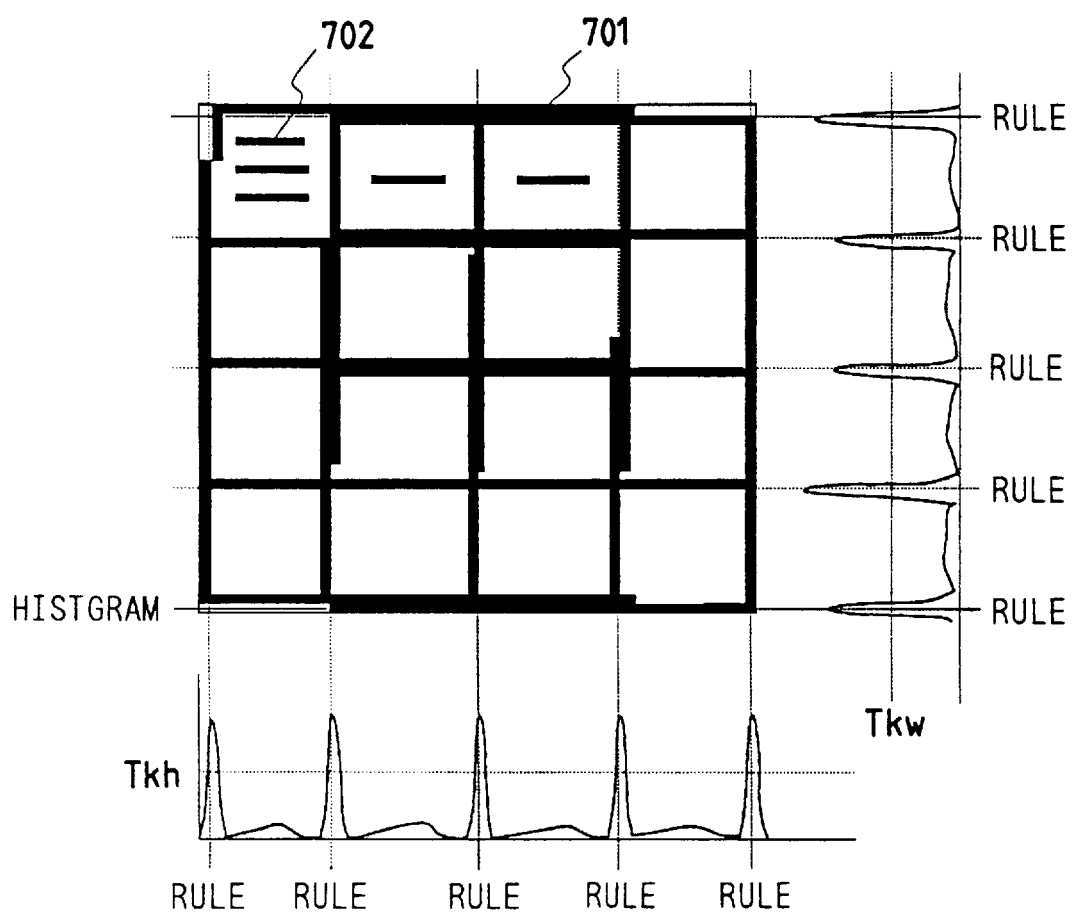
FIG. 24 is a diagram showing a histogram when an area is determined to be a table area of the embodiment 2.

It is certified that error appears in the above-identified patent and that said Letters Patent is hereby corrected as shown below:

SHEET 23:

FIG. 24, "HISTGRAM" should read --HISTOGRAM--.

Figure 25:
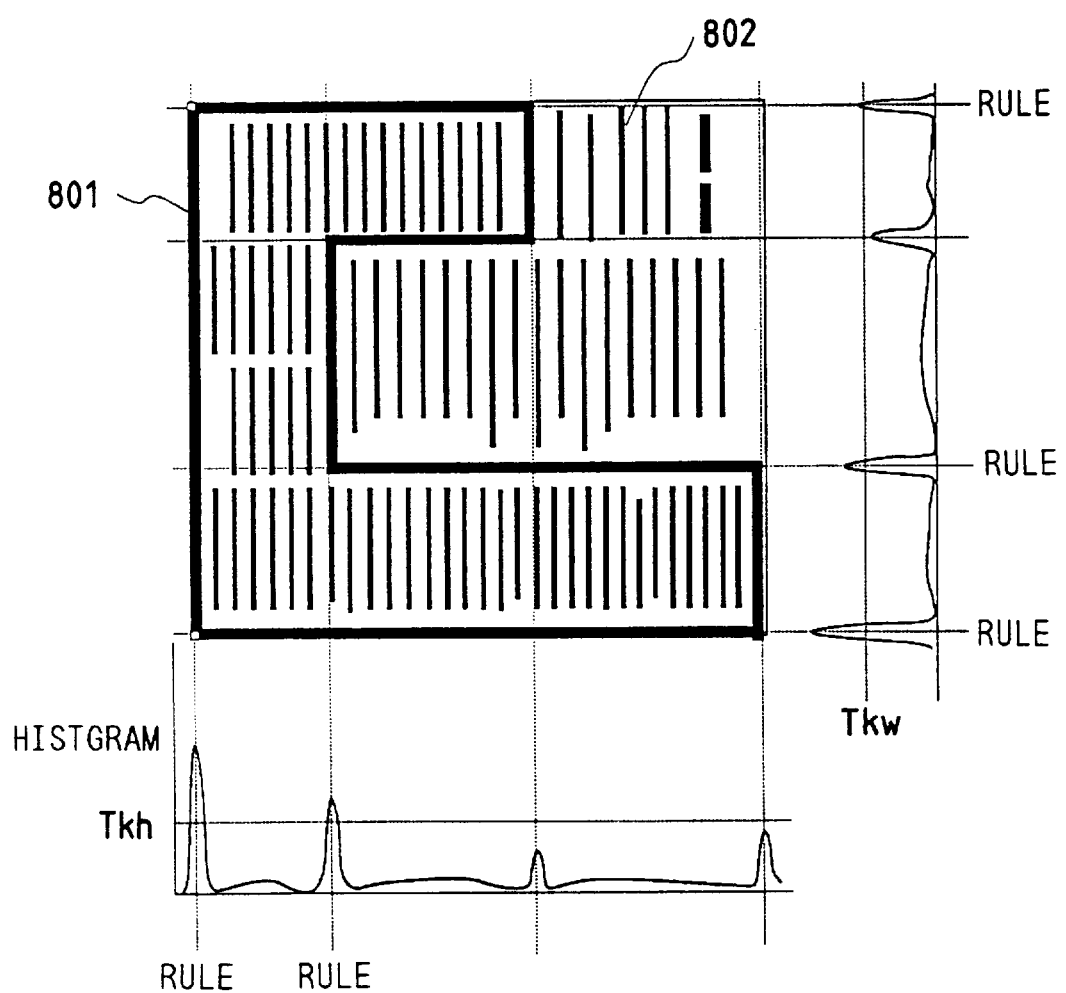
FIG. 25 is a diagram showing a histogram when an area is determined to be a modified separator area of the embodiment 2.

SHEET 24:

FIG. 25, "HISTGRAM" should read --HISTOGRAM--.

SHEET 25:

FIG. 26, "HISTGRAM" should read --HISTOGRAM--.

SHEET 26:

FIG. 27, "HISTGRAM" should read --HISTOGRAM--.

SHEET 27:

FIG. 28, "HISTGRAM" should read --HISTOGRAM--.

COLUMN 1:

Line 46, "are" should read --is--; and
    Line 59, "processes." should read --process.--.

COLUMN 2:

Line 3, "processes." should read --process.--;
    Line 52, "cuits;" should read --cuits:--.

UNITED STATES PATENT AND TRADEMARK OFFICE
CERTIFICATE OF CORRECTION

PATENT NO. : 6,104,832
DATED : August 15, 2000
INVENTOR(S) : KAZUYUKI SAITO ET AL.

It is certified that error appears in the above-identified patent and that said Letters Patent is hereby corrected as shown below:

COLUMN 5:

Line 39, "or a" should read --or--.

COLUMN 12:

Line 58, "lacks" should read --is lacking--; and
    Line 61, "lacks" should read --is lacking--.

COLUMN 13:

Line 57, "obtained" should read --obtained.--.

COLUMN 14:

Line 51, "number horizontal" should read --number of horizontal--.

COLUMN 17:

Line 57, "is-returned" should read --is returned--.

COLUMN 21:

Line 28, "represents" should read --represent--.

UNITED STATES PATENT AND TRADEMARK OFFICE
CERTIFICATE OF CORRECTION

PATENT NO. : 6,104,832
DATED : August 15, 2000
INVENTOR(S) : KAZUYUKI SAITO ET AL.

It is certified that error appears in the above-identified patent and that said Letters Patent is hereby corrected as shown below:

<u>COLUMN 22</u>:

Line 13, "area" should read --areas-- and "a display" should read --display--.

Signed and Sealed this

Fifteenth Day of May, 2001

Attest:

NICHOLAS P. GODICI

Attesting Officer    Acting Director of the United States Patent and Trademark Office